United States Patent
Toma et al.

(10) Patent No.: US 7,567,584 B2
(45) Date of Patent: Jul. 28, 2009

(54) MULTIPLEX SCHEME CONVERSION APPARATUS

(75) Inventors: Tadamasa Toma, Toyonaka (JP); Yoshinori Matsui, Ikoma (JP)

(73) Assignee: Panasonic Corporation, Osaka (JP)

( * ) Notice: Subject to any disclaimer, the term of this patent is extended or adjusted under 35 U.S.C. 154(b) by 598 days.

(21) Appl. No.: 11/033,832

(22) Filed: Jan. 13, 2005

(65) Prior Publication Data

US 2005/0169303 A1 Aug. 4, 2005

(30) Foreign Application Priority Data

Jan. 15, 2004 (JP) ............................. 2004-007817

(51) Int. Cl.
*H04J 3/14* (2006.01)
(52) U.S. Cl. .......................................... 370/466; 714/2
(58) Field of Classification Search ................. 370/389, 370/242, 473, 333, 466
See application file for complete search history.

(56) References Cited

U.S. PATENT DOCUMENTS

| | | | | |
|---|---|---|---|---|
| 5,579,317 A * | 11/1996 | Pang et al. | .................. | 370/392 |
| 5,893,899 A | 4/1999 | Johnson et al. | | |
| 5,920,572 A * | 7/1999 | Washington et al. | ........ | 370/535 |
| 6,091,769 A * | 7/2000 | Moon | .......................... | 375/240 |
| 6,175,573 B1 | 1/2001 | Togo et al. | | |
| 6,252,907 B1 * | 6/2001 | Hwang | .................. | 375/240.25 |
| 6,253,025 B1 * | 6/2001 | Kitamura et al. | ............ | 386/125 |
| 6,490,371 B1 * | 12/2002 | Aoki et al. | .................. | 382/232 |
| 6,594,287 B1 | 7/2003 | Seytter | | |
| 6,678,746 B1 * | 1/2004 | Russell et al. | .................. | 710/1 |
| 6,700,888 B1 * | 3/2004 | Jonsson et al. | .............. | 370/392 |
| 2001/0005371 A1 * | 6/2001 | Sera | ........................... | 370/394 |
| 2002/0150126 A1 * | 10/2002 | Kovacevic | .................. | 370/503 |
| 2002/0152440 A1 * | 10/2002 | Yona et al. | .................. | 714/746 |
| 2003/0004992 A1 * | 1/2003 | Matsui et al. | ............... | 707/512 |
| 2003/0014705 A1 * | 1/2003 | Suzuki et al. | ............... | 714/748 |
| 2003/0044166 A1 * | 3/2003 | Haddad | ...................... | 386/111 |
| 2004/0203698 A1 | 10/2004 | Comp | | |

FOREIGN PATENT DOCUMENTS

| | | |
|---|---|---|
| EP | 0 840 521 | 5/1998 |
| EP | 0 969 673 | 1/2000 |
| JP | 2003-114845 | 4/2003 |

OTHER PUBLICATIONS

Kaindl et al., "Multimedia Data Transmission over Mobile Internet using Packet-Loss Punctured (PaLoP) Codes", Globecom 2003—IEEE Global Telecommunications Conference, Conference Proceedings, San Francisco, Dec. 1-5, 2003, IEEE Global Telecommunications Conference, New York, NY: IEEE, US, vol. 7, of 7, Dec. 1, 2003, pp. 2015-2019.

"Series H: Transmission of Non-Telephone Signals", ITU-T Telecommunication Standarization Sector of ITU, Geneva, CH, 1996, pp. A-B, I, XP000667441, Section 7.

J. Hagenauer et al., "Error robust multiplexing for multimedia applications—Fundamentals and Applications", Signal Processing, Image Communication Elsevier Science Publishers, Amsterdam, NL, vol. 14, No. 6-8, May 1999, pp. 585-597.

\* cited by examiner

*Primary Examiner*—Ricky Ngo
*Assistant Examiner*—Ben H Liu
(74) *Attorney, Agent, or Firm*—Wenderoth, Lind & Ponack, L.L.P.

(57) ABSTRACT

A multiplex scheme conversion apparatus (103) includes (i) a packet loss judgment unit (202) that judges the packet loss of a TS packet, performs error processing in the case where a packet loss is detected, and outputs the payload data on which error processing has already been performed and (ii) a Box making unit (206) that makes 'moov' including error information and 'mdat' based on inputted AU data and the display time in a PES header.

4 Claims, 29 Drawing Sheets

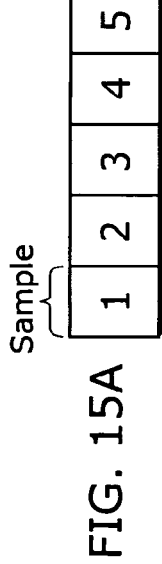

FIG. 15A

Sample
| 1 | 2 | 3 | 4 | 5 | 6 | 7 | 8 | 9 | 10 | ... | 14 | 15 | 16 | ... | 20 | ... |

Sample including error

Error Sample Table
| 7 |
| 9 |
| 15 |
| ... |

FIG. 15B

```
aligned(8)  class ErrorSampleBox
     extends FullBox('stse', version = 0,0) {
  unsigned int(32)  entry_count;
  int i;
  for (i=0; 1 < entry_count;  i++) {
     unsigned int(32)  error_sample_number;
  }
}
```

FIG. 15C

```
aligned(8)  class ErrorSampleBox
     extends FullBox('stse', version = 0,0) {
  unsigned int(12)  entry_count;
  int i;
  for (i=0; 1 < entry_count;  i++) {
     unsigned int(32)  error_sample_number;
     for (i=0;  i < nal_unit_count; i++) {
         unsigned int(32) error_nal_unit_number;
     }
  }
}
```

FIG. 15D

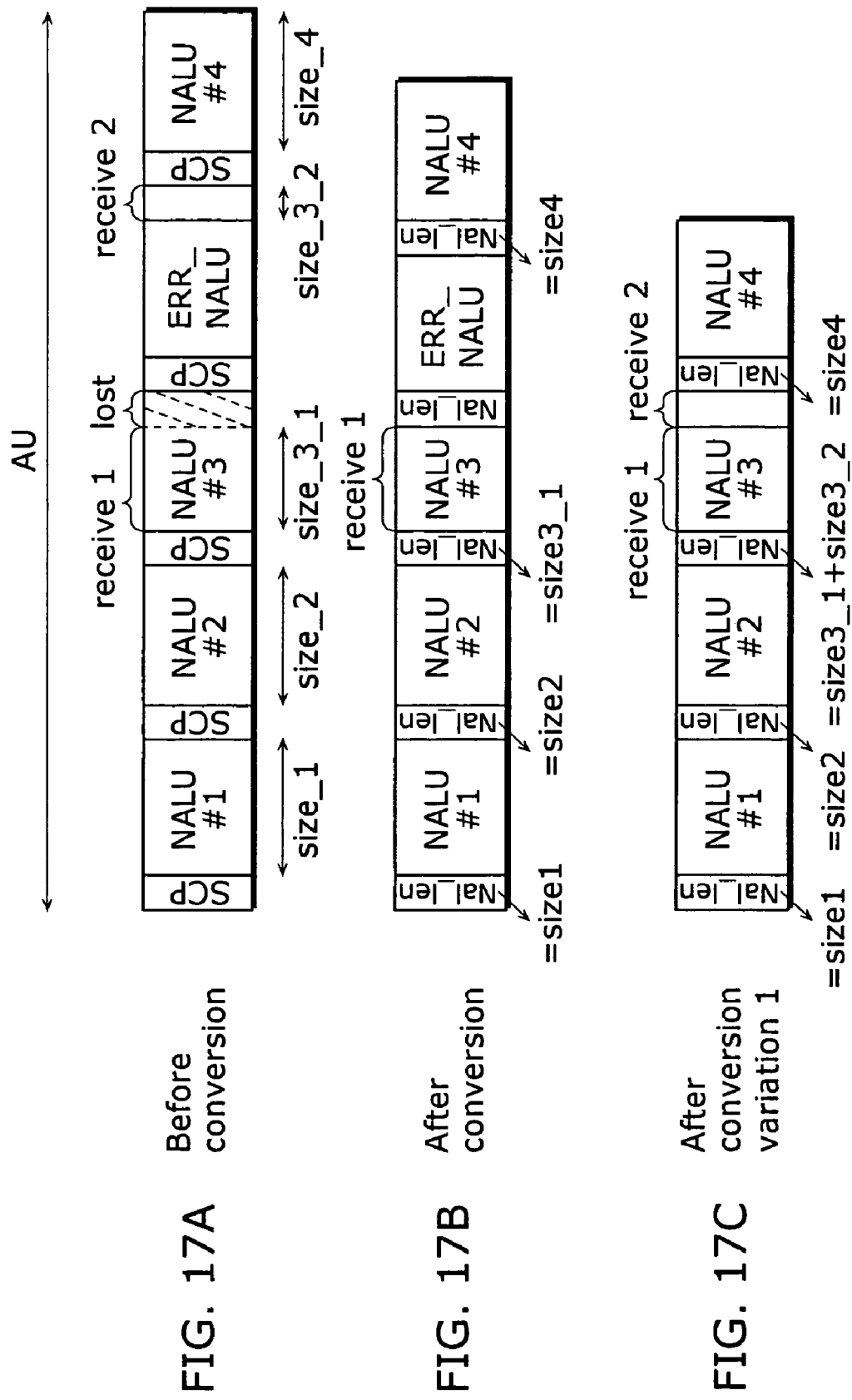

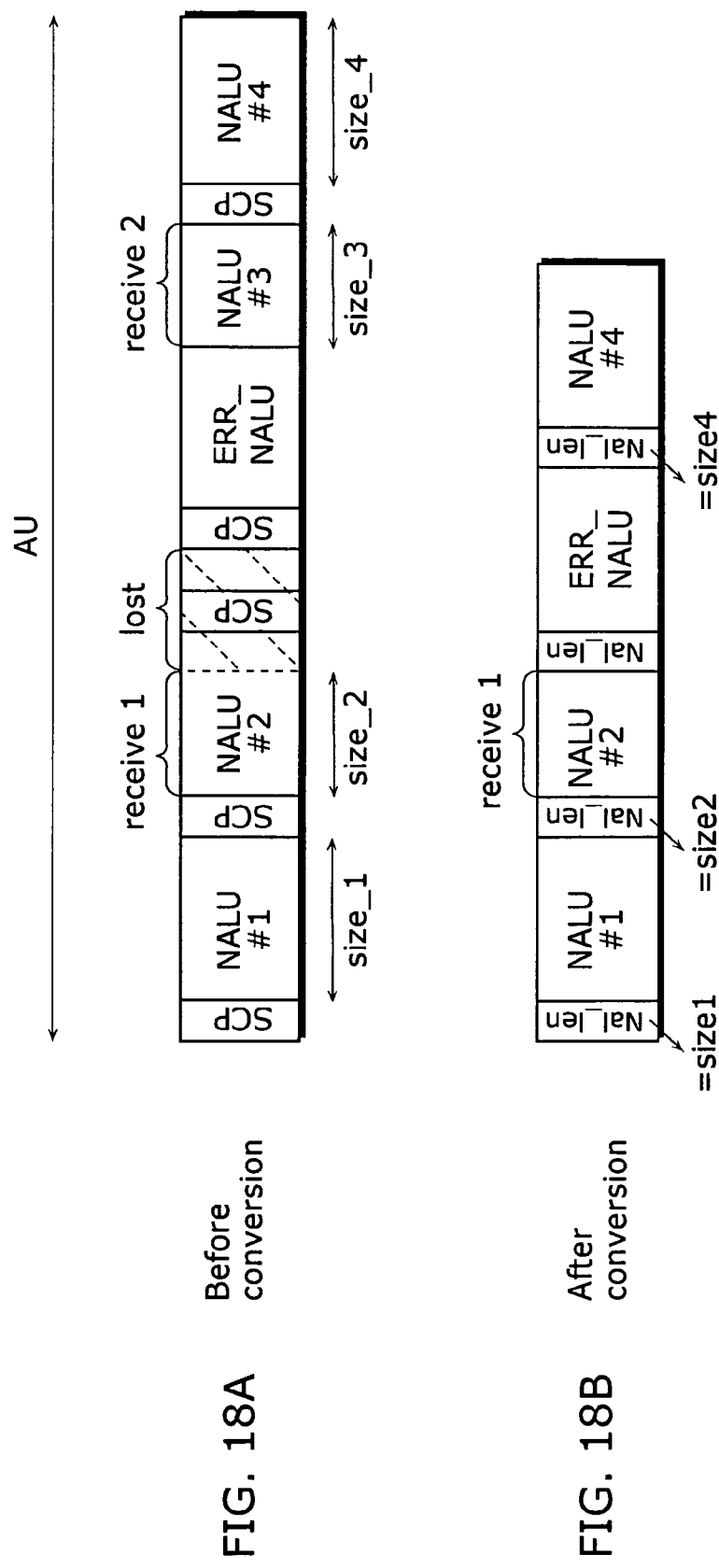
FIG. 18A Before conversion
FIG. 18B After conversion

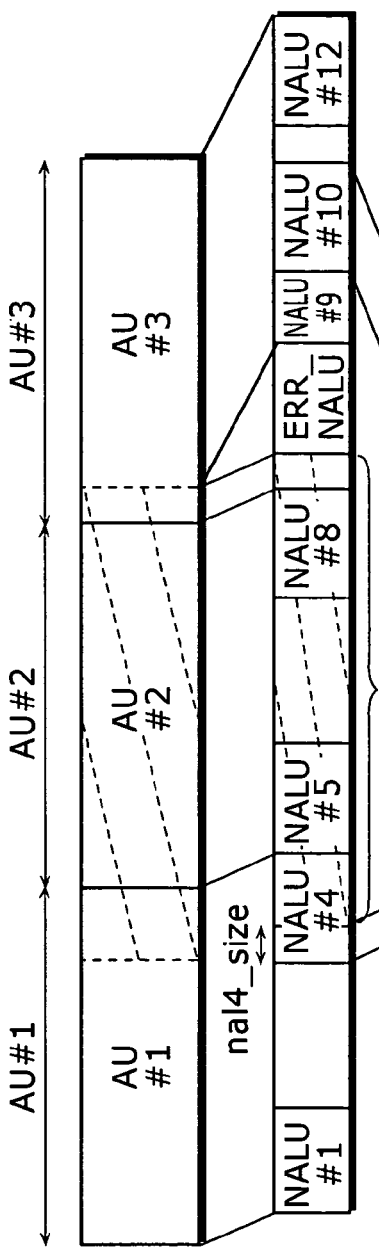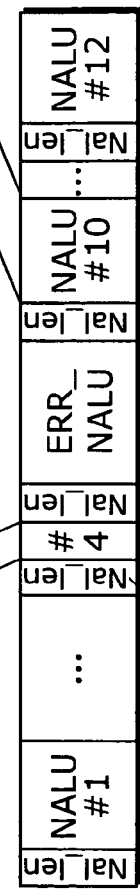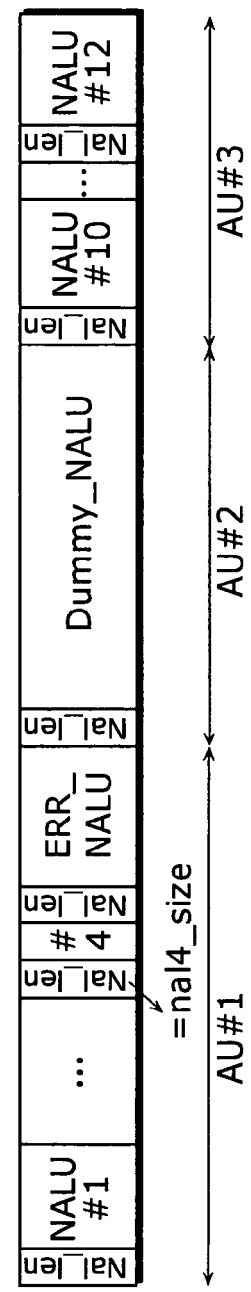
FIG. 19A Before conversion
FIG. 19B After conversion
FIG. 19C After conversion variation 1

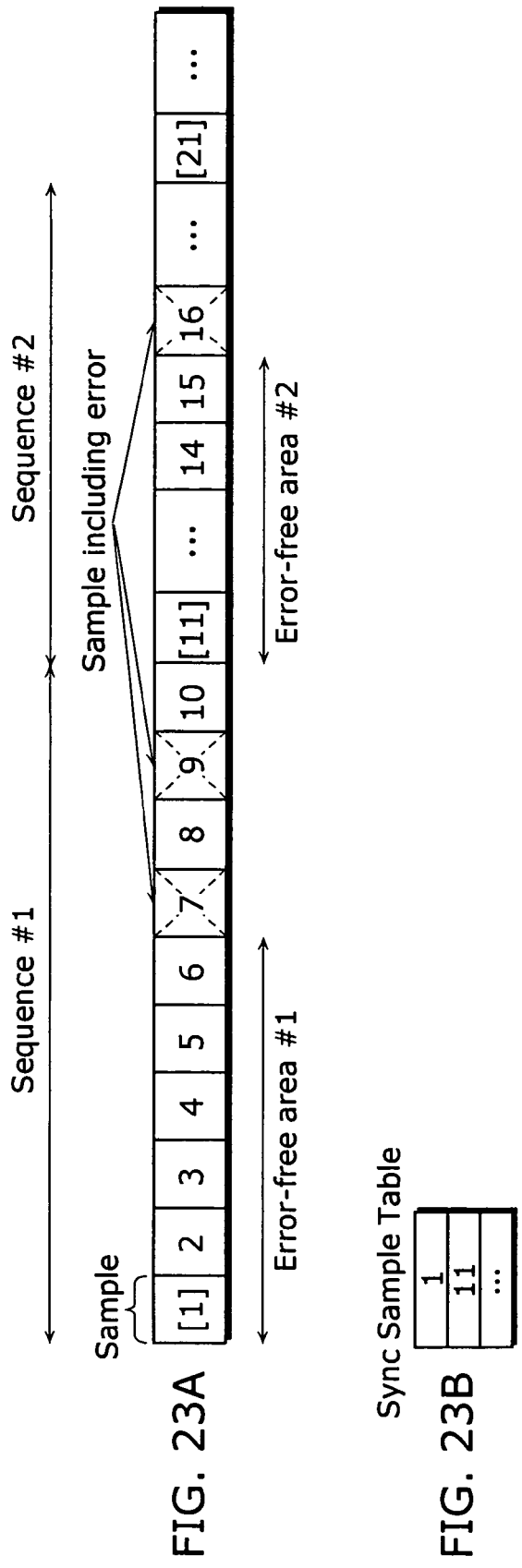

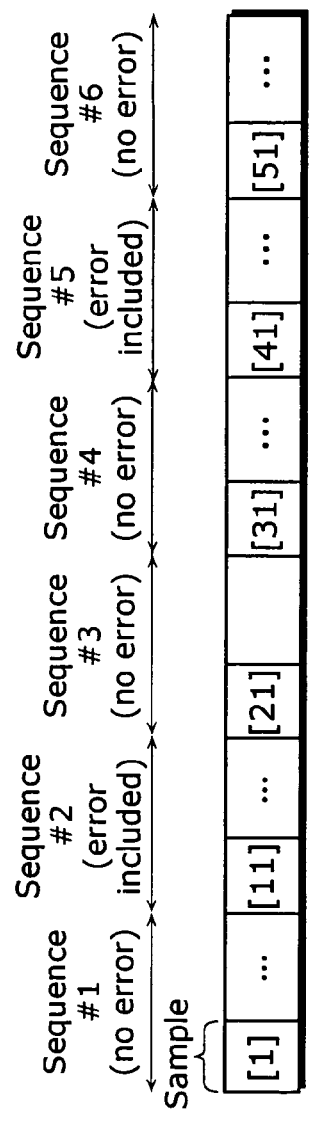
FIG. 24A
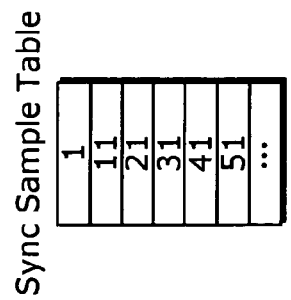
FIG. 24B
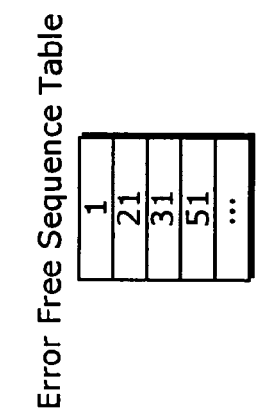
FIG. 24C
FIG. 24D

MULTIPLEX SCHEME CONVERSION APPARATUS

BACKGROUND OF THE INVENTION (1) Field of the Invention

The present invention relates to a multiplex scheme conversion apparatus for converting the multiplex scheme of the coded media data such as video and sound and outputting the converted coded media data.

(2) Description of the Related Art

With the recent increase in the capacity of storage media and communication networks or the development of communication techniques, apparatuses and services for processing coded multimedia data such as video and sound have become popular. For example, in the broadcasting field, conventional analog broadcasting is being replaced by digitally coded media data broadcasting. The digital broadcasting is received by only immobile apparatuses at present, but in the future, broadcasting for mobile apparatuses such as mobile phones is scheduled to be started. Also, in the communication field, the environment where multi media data is handled by both immobile terminals and mobile terminals is being prepared. For example, a video distribution service for third generation mobile phones has already been started. In light of the present situation, the use method of recording content data received via broadcasting or the Internet on memory cards such as secure digital (SD) cards or optical discs such as digital versatile disk-rewritable (DVD-RAM) and causing such apparatuses to share the content data is expected to become popular.

At the time of distributing media data via broadcasting or networks, or by using a storage medium, the header information and the media data necessary for reproducing media data are multiplexed. In multiplexing, a multiplex scheme is standardized respectively for broadcasting, storage apparatuses such as DVDs and mobile apparatuses. First, for digital broadcasting or DVDs, the moving picture expert group (MPEG-2) system standard that is standardized by the International standardization organization/international engineering consortium (ISO/IEC JTC1/SC29/WG11) is used. Also, for mobile terminals, the MP4 file format standardized by the ISO/IEC JTC1/SC29/WG11 is employed in the Transparent end-to-end packet switched streaming service (TS26.234) prescribed, as a wireless video distribution standard, by the Third generation partnership project (3GPP) that is the international standardization group that is an establishment for standardizing the third generation mobile communication system.

Also, the MPEG-4 advanced video coding (AVC) is standardized as the standard that succeeds the MPEG-2 Visual or the MPEG-4 visual that are popular as a video coding method at present. Therefore, it is expected that coded video data of the MPEG-4 AVC is multiplexed, broadcast, stored or distributed using the MPEG-2 system standard or the MP4 file format (called MP4 from here).

The outline of coded data multiplex scheme in the MPEG-2 system and the MP4 will be described below. In the MPEG-2 system and the MPEG-4, the basic unit used in handling coded data is an access unit (AU), and the structure of an AU will be described first. An AU as a unit includes coded data for one picture, and the AU data in the MPEG-4 AVC has the structure shown in FIGS. 1A to 1C. In the MPEG-4 AVC, it is possible to include, in AU data, not only the data necessary for decoding pictures but also supplementary information called supplemental enhancement information (SEI) that is unnecessary for decoding, AU boundary information and the like. All the data is stored in the network adaptation layer (NAL) unit. Note that, in the MPEG-2 system, a NAL unit called access unit delimiter indicating the start of an AU is surely added to the top of the AU. The NAL unit is composed of a header and a payload as shown as FIG. 1A. The header size is 1 byte and the header includes a field indicating the type of data stored in the payload (called NAL unit type from here). NAL unit type values are defined based on the respective kinds of data such as a slice and a SEI, a NAL unit type is referred to when obtaining a data type stored in the NAL unit. A NAL unit such as a header information and a SEI are stored in an AU in addition to slice data for one picture as shown as FIGS. 1B and 1C. As information for identifying the boundary of NAL unit data that is not included in the NAL unit, identification information can be added to the top of each NAL unit when an AU is stored. Identification information is added using the following two types of addition methods: adding a start code prefix shown in 3 bytes of 0x000001 (called byte stream format from here) in FIG. 1B; and adding the size of NAL unit as shown in FIG. 1C (called NAL size format from here). Note that it is prescribed that at least one zero_byte whose value is 0x00 that is represented in 1 byte is added before the start code prefix of the leading NAL unit and a NAL unit having a specific NAL unit type value of an AU. The byte stream format is used in the MPEG-2 system, and the NAL size format is used in the MP4.

Next, a slice and header information will be described in detail. Slices are roughly divided into two types: Instantaneous decoder refresh (IDR) slices; and the other type of slices. An IDR slice is slice data that is intra-coded, and header information such as later-described sequence parameter set (SPS) and the like can be switched only in such an IDR slice. In the case where an IDR slice is included in a picture, the other slices in the picture are IDR slices, therefore, an AU including IDR slices is called as an IDR AU from here. Also, a unit composed of AUs from an IDR AU to the AU immediately before the next IDR AU is called sequence. Here, random accesses are performed, on a sequence-by-sequence basis because only AUs in a sequence are referred to in decoding slice data of an AU. Next, there are two types of header information: SPS; and picture parameter set (PPS). SPS is header information that is fixed on a sequence-by-sequence basis and PPS is header information that is switchable on a picture-by-picture basis. Header information can include several SPSs and PPSs, and these SPSs and PPSs are distinguished from each other based on index numbers. Also, one SPS or PPS is stored in one NAL unit. Index numbers of an SPS and a PPS that are referred to by each picture are obtained in the following way. First, the index number of a PPS referred to by a picture is shown in the header part of slice data. Next, as the index number of an SPS referred to by the PPS is shown in the PPS, the index number of the SPS referred to by the picture can be obtained by analyzing the PPS referred to by the picture. An SPS and PPS referred to by a picture is necessary in decoding the slice data of a picture.

Next, boundary information addition method in broadcasting at the time of separating AU data by the MPEG-2 system will be described. In the MPEG-2 system, the coded data is multiplexed into a packetized elementary stream (PES) packet and then the PES packet is multiplexed into a transport stream (TS) packet. FIG. 2A shows the structure of a PES packet, and FIG. 2B shows the structure of a PES packet and a TS packet. In the payload of a PES packet, access unit (AU) data is stored. FIG. 2A (1) to (3) show a storage example indicating how AU data is stored in the payload of a PES packet. Several AUs may be stored together as shown in FIGS. 2A(1) and 2A(2) and AU data may be divided and stored as shown in FIG. 2A(3). Further, in the payload, staffing data can be included separately from the AU data. The header of the PES packet starts from a 4-byte start code composed of a start code prefix shown in 3 bytes of 0x000001 and a stream ID represented in 1 byte. The stream ID is an identification number indicating the type of a coded data included in the payload data of the PES packet, and the identification number may be an arbitrary value between 0xE0 and 0xEF inclusive in the MPEG-4 AVC. It is possible to store, in the header, decoding time and display time of the leading AU in the payload, but such pieces of time information are not always stored in all PES packets, in other words, there are PES packets where no time information is stored. In the case where pieces of time information being the decoding time or the display time, on AU are not shown by the header of a PES packet but needed, AU data is analyzed and the differential value in decoding time or display time of the current AU and the immediately before AU is obtained. Note that the starting position in a PES packet is detected by searching 4-byte start code in the payload data of TS packets. On the other hand, the data of the PES packet is divided and stored in the payloads of TS packets as shown in FIG. 2B. A TS packet is a packet having a fixed length of 188 bytes, and it is composed of a 4-byte header, an adaptation field and payload data. Note that an adaptation field is included only in the case where a specific flag is set in the header. In the header, an identification number called PID indicating the type of data transmitted by the TS packet and a counter called continuity_counter is included. The continuity_counter is a 4-bit field. In the case of TS packets having an identical PID, values are incremented one by one according to the sending order of such TS packets until values are incremented to be the maximum value and then re-counted from the starting value. The association between the PID of a TS packet and the type of data transmitted by the TS packet is separately provided in program information transmitted by the TS packet. Therefore, at the time of receiving TS packets, PIDs of TS packets are obtained first, and then these packets are divided depending on PID values. For example, in the case where the program information obtained at the starting time of receiving shows that the MPEG-4 AVC data is transmitted by the TS packet whose PID is 32, obtaining the TS packet whose PID is 32 makes it possible to obtain the AU data of the MPEG-4 AVC. Here, a gap between continuity_counter values of the received TS packets indicates that a packet loss has occurred in a transmission path. In addition, in the case where AU data is separated from a TS packet, a PES packet is separated from the payload data of a TS packet and the AU data is separated from the separated PES packet.

Lastly, the multiplex scheme of AU data in the MP4 will be described. In the MP4, header information on a sample-by-sample basis or media data is managed on an object-by-object basis. The object is called Box. Here, a sample is a basic unit in handling media data in the MP4, and one sample corresponds to 1 AU. A sample number is assigned to each sample in an ascending order of decoding time, and these sample numbers are incremented by one for each sample. FIG. 3A shows the structure of the Box composed of the following fields: (i) size that is the size of the whole Box including a size field; (ii) type that is a Box identifier, the identifier basically being four alphabets, the field length being 4 bytes, and the Box in the MP4 file being searched by judging whether the sequential 4-byte data matches the identifier of the type field; (iii) version that is the version number of the Box; (iv) flags that is the flag information set for each Box; and (v) data that is data such as header information or media data.

Note that some Boxes do not include fields of version and flags because they are unnecessary. Identifiers of type fields are used in referring to Boxes in the following description, for example, the Box whose type is 'moov' is called 'moov'. The Box structure in the MP4 file is shown as FIG. 3B. The MP4 file is composed of 'fytp', 'moov' and, 'mdat' or 'moof', and 'fytp' is placed in the top of the MP4 file. Information for identifying an MP4 file is included in 'fytp', and media data is stored in 'mdat'. Each media data included in 'mdat' is called 'trak', and each 'trak' is identified by a 'trak' ID. Next, header information on a sample included in each 'trak' of 'mdat' is stored in 'moov'. In 'moov', as shown as FIG. 4A, Boxes are hierarchically placed, and pieces of header information of audio media tracks and video media tracks are separately stored in a 'trak'. In a 'trak', Boxes are hierarchically placed, and the following information is stored in each Box in 'stbl': (i) sizes, decoding time and display starting time of samples; or (ii) information on randomly-accessible samples (FIG. 4B). Such randomly-accessible samples are called Sync samples, and a list of sample numbers of the Sync samples is shown by 'stss' in 'stbl'. The header information of all the samples in a 'trak' is stored in 'moov' in the above description, but it is possible to divide these 'trak's into fragments and store the header information on a fragment-by-fragment basis. The header information on each unit obtained by dividing the 'trak' is shown in 'moof'. In the example of FIG. 5, the header information of samples to be stored in 'mdat' #1 can be stored in 'moof' #1.

Here is a case where broadcasting data received in a mobile terminal such as a mobile phone is transmitted by e-mail in a form of an attachment. In 3GPP, in the case where video and sound are handled in e-mail, it is prescribed that such media data is multiplexed using the MP4. Therefore, the TS multiplex scheme needs to be converted to the MP4 at the time of transmitting e-mail. The following is the description of how a conventional multiplex scheme conversion apparatus converts, into the MP4 file, the packet sequence of TS packets where coded data of the MPEG-4 AVC is multiplexed (For example, refer to Japanese Laid-Open Patent application No. 2003-114845). Note that fragments are not used in the converted MP4. FIG. 6 is a flow chart showing the conversion operation. In the step 101, the PES packet data is separated, from the payload of the inputted TS packet, by detecting the starting position of the PES packet. Next, in the step 102, the starting position of an AU is detected from the payload of the separated PES packet. Step 101 and step 102 are repeated until the starting position of an AU is detected (Loop A), and the AU data for 1 AU is separated at the time of the detection. The display time information shown in the PES header is obtained in the step 103, and 'moov' and 'mdat' are made in the step 104. Processing from step 101 to step 104 is repeated until the processing of the last TS packet is completed (Loop B), in other words, Loop B is completed at the time of processing all the AUs in media data. After that, in the step 105, data of 'moov' and 'mdat' are connected to each other, and the MP4 file is completed. FIG. 7 is a flow chart showing the processing of step 104 in detail. In the step 201, the header information necessary for making Boxes in 'moov' is obtained by analyzing AU data. In the step 202, storage format of NAL units composing an AU is converted from a byte stream format to a NAL size format. In the step 203, Box data in 'moov' is made based on the header information of AUs obtained in the step 201. In the step 204, 'mdat' data is made. Note that a Box for storing the header information, which includes the size and decoding time of a sample, for each sample is completed at the time when processing of all the AUs in a 'trak' is completed.

Depending on weather or other receiving conditions, a packet loss occurs at the time of receiving TS packets to be broadcast. Especially, in a case where they are received by a mobile terminal such as a mobile phone, packet losses frequently occur. In the case of TS packets, it is possible to detect that AU data is lost because of a packet loss by checking whether continuity_counter value is discontinuous or not, but in the case of MP4, it is impossible to show that sample data is lost. This is the cause of the first problem that sample data cannot be correctly decoded because data is lost at the time of reproducing the MP4 file, resulting in video data with low picture quality being displayed.

Further, at the time of converting a multiplex scheme from TS to MP4, the storage format of the NAL unit must be converted from a byte stream format to a NAL size format. In the byte stream format, the boundary of the NAL units is detected by detecting a start code added to the top of the NAL unit. However, in the case where the boundary part is lost because of a packet loss, the boundary cannot be detected. This makes it impossible to separate the data of the NAL unit correctly. Conventionally, there is no prescribed storing method of the NAL unit data, as a sample of MP4, which can be used in the case where NAL unit data cannot be separated correctly. This is the cause of the second problem that data to be stored in a converted NAL unit cannot be determined.

SUMMARY OF THE INVENTION

Therefore, the present invention is conceived considering the above-mentioned circumstances. An object of this invention is to provide a multiplex scheme conversion apparatus that can avoid displaying the video data that cannot be correctly decoded to a user.

In order to achieve the above-mentioned object, the multiplex scheme conversion apparatus in the present invention (i) packet-multiplexes the coded media data using the second scheme which is different from the first scheme by which the coded media data has been packet-multiplexed and (ii) outputs the coded media data that is packet-multiplexed using the second scheme, and includes: a packet loss judgment unit that judges whether or not a packet loss has occurred in the coded media data that is packet-multiplexed using the first scheme; a loss information making unit that makes loss information concerning a loss of data, based on a position at which the data is lost in the coded media data, in the case where the packet loss judgment unit judges that a packet loss has occurred; and a multiplex unit that stores the loss information made by the loss information making unit in a packet that is multiplexed using the second scheme and to packet-multiplex the coded media data using the second scheme.

For example, in a second-scheme file such as the MP4, this makes it possible to obtain information on the samples whose data is partly lost because of a packet loss of a TS packet that is multiplexed using the first scheme that is the MPEG-2 system TS without decoding the sample data, and therefore, it becomes possible to determine the operation of decoding or displaying samples in the system layer higher than, for example, the audio or video decode unit.

Also, in a first aspect of the present invention, the multiplex scheme conversion apparatus may further include a packet separation unit that separates a header from a payload of a packet of the coded media data that is packet-multiplexed using the first scheme.

Also, in a second aspect of the present invention, the multiplex scheme conversion apparatus may further include a frame separation unit that detects, in the payload separated by the packet separation unit, a boundary of frames in the coded media data and separate the frames, and in the multiplex scheme conversion apparatus, the loss information making unit makes loss information concerning a loss of data on a frame-by-frame basis based on a position at which the data is lost in the coded media data in the case where the packet loss judgment unit judges that a packet loss has occurred, and the multiplex unit stores loss information made, on a frame-by-frame basis, by the loss information making unit, in the packet that is multiplexed using the second scheme. Here, the loss information making unit may make the information, as the loss information, indicating the area including frames (i) at which data necessary for decoding are not lost and (ii) that are placed continuously in a decoding order.

For example, in a second-scheme file such as the MP4, this makes it possible to specify the area where samples can be correctly decoded. This can prevent samples whose data is lost from being decoded resulting in allowing a turbulent picture to be outputted, and thus it is possible to prevent the deterioration of reproduction quality.

Also, in a third aspect of the present invention, the multiplex scheme conversion apparatus may further include a table making unit that makes a table for registering a randomly-accessible frame, and in the multiplex scheme conversion apparatus, the multiplex unit judges whether or not data necessary for decoding a frame is lost in the frame, based on a position at which data is lost in the coded media data, at the time of registering, in the table, a randomly-accessible frame in the coded media data, and, in the case where data necessary for decoding a frame is lost in the frame, the multiplex unit does not register, in the table, the frame as a randomly-accessible frame.

As this guarantees that Sync samples can be correctly decoded, for example, in the MP4 file that is multiplexed using the second scheme, it becomes possible to prevent reproduction quality from deteriorating at the time of random access.

Also, in the third aspect of the present invention, the multiplex scheme conversion apparatus may further include a conversion unit that converts a storage format of the coded media data. Here, "storage format" has a narrower scope than "multiplex scheme" does. For example, it is a storage format of frame data.

Also, in another aspect of the present invention, in the multiplex scheme conversion apparatus, the frame is composed of a sub-frame unit, and the conversion unit (i) determines sub-frame data to be stored in the packet that is multiplexed using the second scheme and a size of the sub-frame data, based on the position at which data is lost in the coded media data, and (ii) converts the storage format by adding size information of the sub-frame unit to the top of each sub-frame unit.

This makes it possible to convert the AU data of the MPEG-4 AVC into a NAL size format also in the case where data is lost because of a packet loss, for example, in the MP4 file that is multiplexed using the second scheme.

Also, the frame may be composed of a sub-frame unit, and the conversion unit may insert such sub-frames indicating the presence of a packet loss into the position at which a packet loss has occurred in the coded media data and then packet-multiplex the coded media data using the second multiplex scheme.

In this way, for example, in a second-scheme file such as the MP4 file, detecting a NAL unit for notifying packet loss information that is inserted in the sample data enables the decode unit to identify the position at which AU data is lost, and thus it becomes possible to perform appropriate error concealment processing.

Also, in a fourth aspect of the present invention, in the multiplex scheme conversion apparatus, the loss information making unit may make information indicating whether or not data necessary for decoding a predetermined unit is lost, as the loss information.

In this way, for example, in a second-scheme file such as the MP4 file, it is possible to identify, in the system layer, the sample where the data such as a Sequence parameter set (SPS) and a Picture parameter set (PPS) that is necessary for decoding is lost. Therefore, it becomes possible to prevent the deterioration of reproduction quality caused by decoding samples whose data is partly lost resulting in outputting a turbulent display picture.

Also, the demultiplexer in the present invention decodes packet-multiplexed data of coded media data and includes: a loss information extraction unit that extracts, from the multiplexed data, loss information concerning a loss of data; a loss information analysis unit that determines data to be decoded in the coded media data, based on the loss information extracted by the loss information extraction unit; and a decode unit that decodes the data to be decoded, determined by the loss information analysis unit.

In this way, in multiplex data such as an MP4, it is possible to determine the operations for decoding and displaying samples with reference to the Box for indicating sample loss information. Therefore, it becomes possible to prevent the deterioration of reproduction quality caused by decoding samples whose data is partly lost resulting in outputting a turbulent display picture. In addition, it becomes possible to obtain the same output result also in the case where another decode and display unit which performs a different error concealment method is used.

Also, in the fourth aspect of the present invention, the demultiplexer may further include a loss information notification unit that makes a notification concerning reproduction quality to a user based on the loss information extracted by the loss information extraction unit.

In this way, in multiplex data such as an MP4, it is possible to notify a user of reproduction quality such as the loss rate of sample data (lost data/all data).

Further, the present invention can be realized not only as (i) a multiplex scheme conversion apparatus and a demultiplexer like this, but also as (ii) a multiplex scheme conversion method and demultiplex scheme including steps that respectively correspond to the characteristic units of such a multiplex scheme conversion apparatus and a demultiplexer and as (iii) a program causing a computer to execute these steps. Also, such a program can be distributed via recording media such as CD-ROMs or communication media such as the Internet.

As clearly described up to this point, the multiplex scheme conversion apparatus in the present invention can indicate the video data that cannot be correctly decoded, and thus it becomes possible to prevent the deterioration of reproduction quality.

The disclosure of Japanese Patent Application No. 2004-007817 filed on Jan. 15, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 15A to 15D are an example procedure of making the Error sample box in the multiplex scheme conversion apparatus in the first embodiment of the present invention;

FIGS. 17A to 17C show an example of converting sample data in the case where a packet loss occurs without crossing a NALU boundary in the multiplex scheme conversion apparatus in the first embodiment of the present invention;

FIGS. 18A and 18B are an example of converting sample data in the case where a packet loss occurs crossing NALU boundary in the multiplex scheme conversion apparatus in the first embodiment of the present invention;

FIGS. 19A to 19C show an example of converting a sample data in the case where a packet loss occurs crossing a boundary of AUs in the multiplex scheme conversion apparatus in the first embodiment of the present invention;

FIGS. 23A to 23D show an example procedure of making the Error free end sample box in the multiplex scheme conversion apparatus in the third embodiment of the present invention;

FIGS. 24A to 24D show an example procedure of making the Error free end sample box in the multiplex scheme conversion apparatus in the third embodiment of the present invention;

DESCRIPTION OF THE PREFERRED EMBODIMENT(S)

Embodiments of the present invention will be described below with reference to the figures.

First Embodiment

First, the multiplex scheme conversion apparatus concerning a first embodiment of the present invention will be described with reference to FIG. 8 to FIG. 19. Here, TS packets where coded video data of the MPEG-4 AVC are multiplexed are inputted, after that, AU data are separated from the TS packets, multiplexed into an MP4 and outputted. Note that the coded data multiplexed into packets is not limited to the MPEG-4 AVC, video coded data such as the MPEG-4 visual and H.263, the VC-1 that is on the stage of standardization by the Society of motion picture and television engineers (SMPTE), or audio coded data such as the MPEG-4 AAC and AMR may be used. Further, not only TS packets that transmit video coded data but also audio or program information may be included in the TS packets to be inputted. In this case, TS packets including program information are obtained first, and then PIDs of TS packets that transmit video and audio coded data are determined. After that, TS packets are divided into video TS packets and audio TS packets based on PID values and then processed respectively.

Figure 1B:
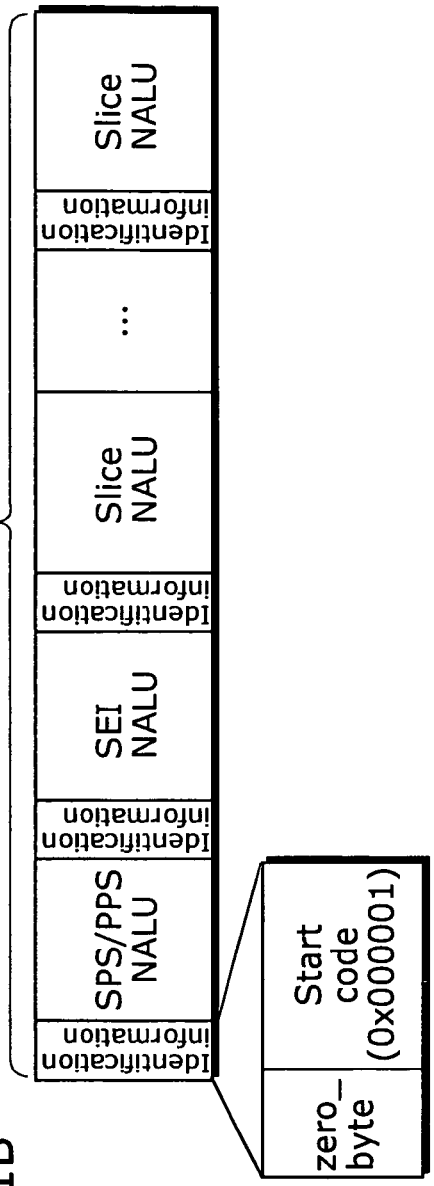
FIGS. 1A to 1C are a diagram showing the data structure of an AU in the MPEG-4 AVC.
Figure 1C:
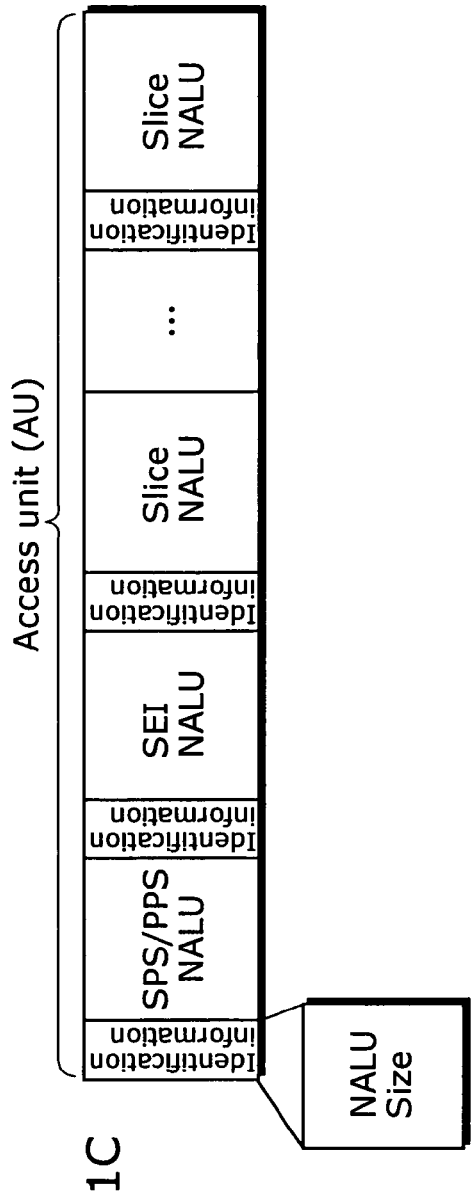
Figure 1A:
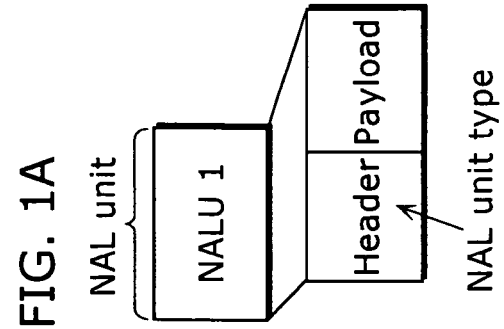
Figures 2A, 2B:
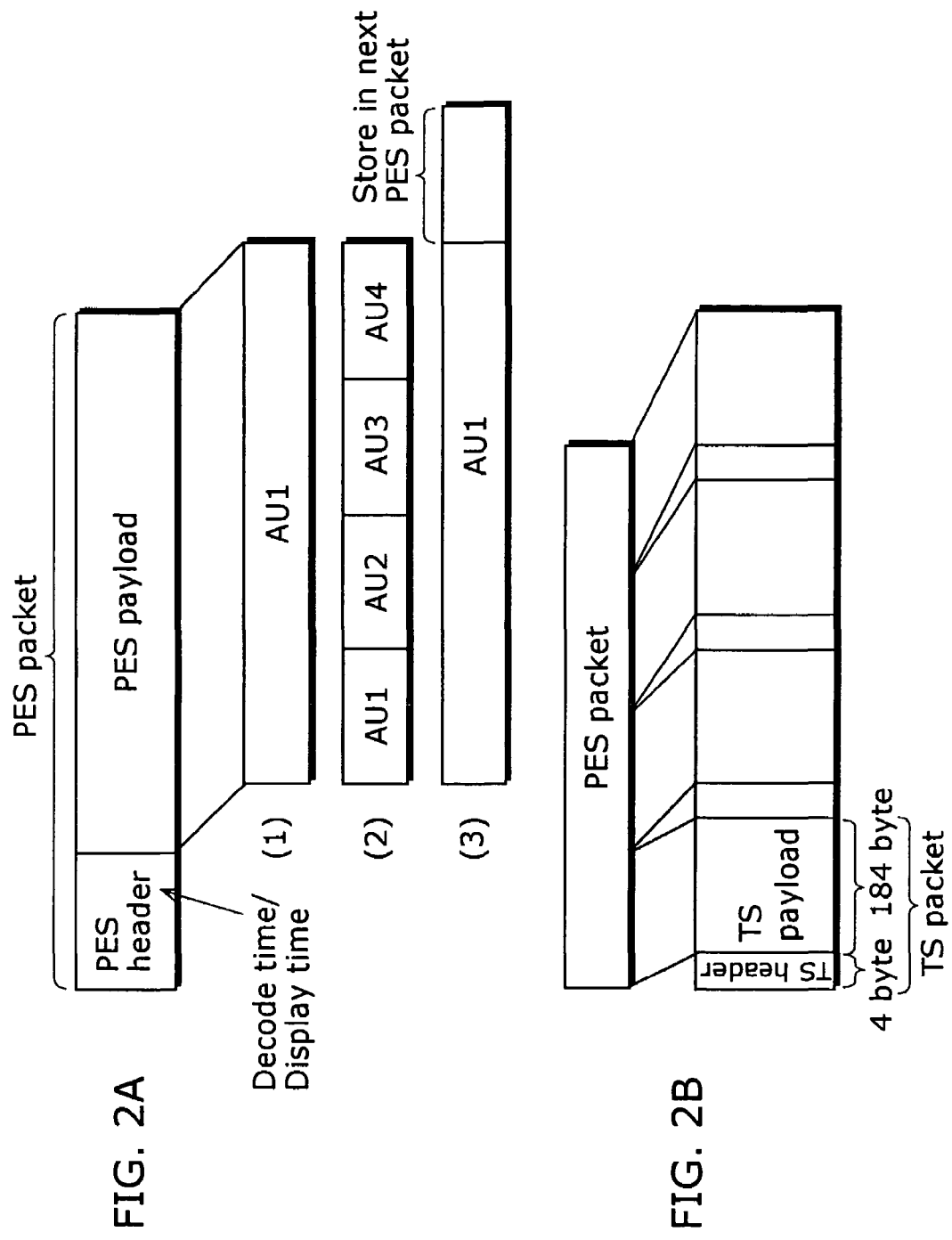
FIGS. 2A and 2B are a diagram showing the data structure of a PES packet and a TS packet.
Figure 3B:
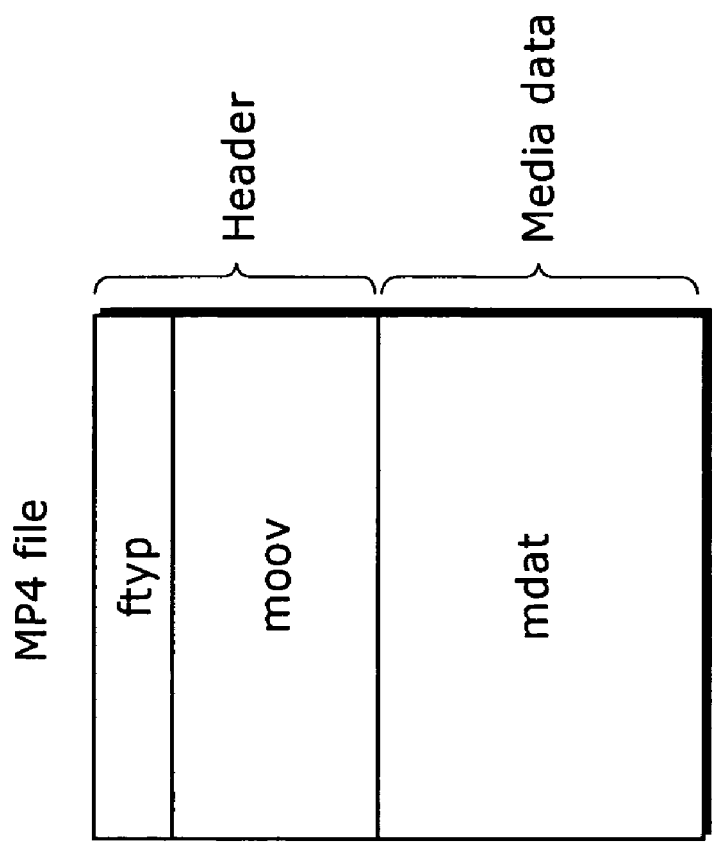
FIGS. 3A and 3B are a diagram showing the Box structure of an MP4.
Figure 3A:
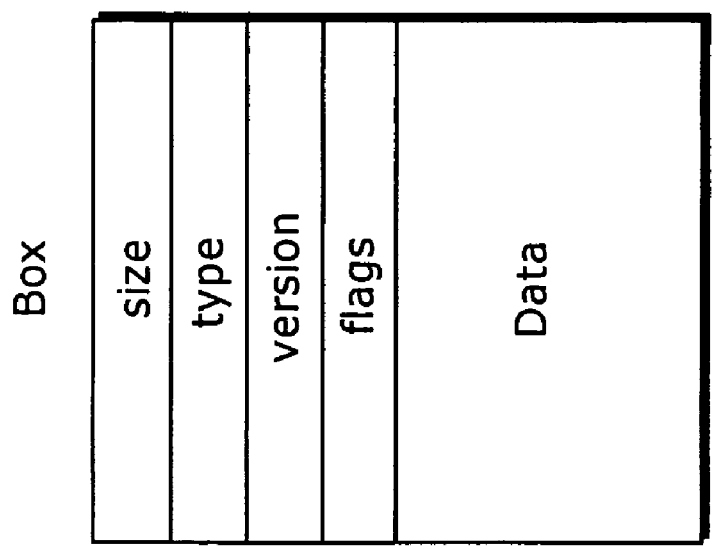
Figure 4B:
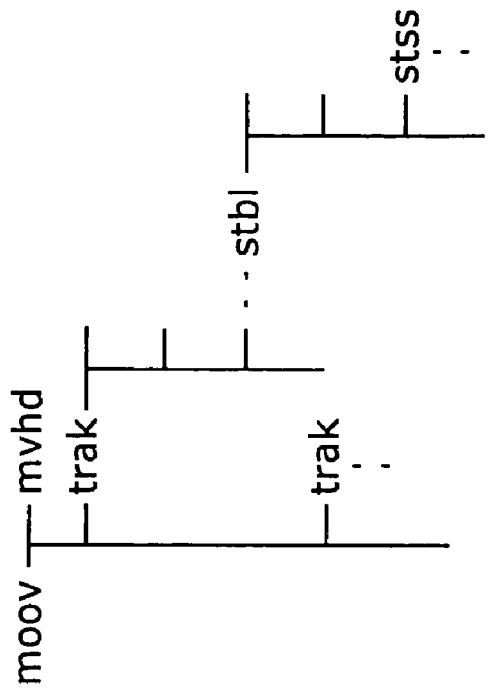
FIGS. 4A and 4B are a diagram showing the hierarchical structure of 'moov' in the MP4.
Figure 4A:
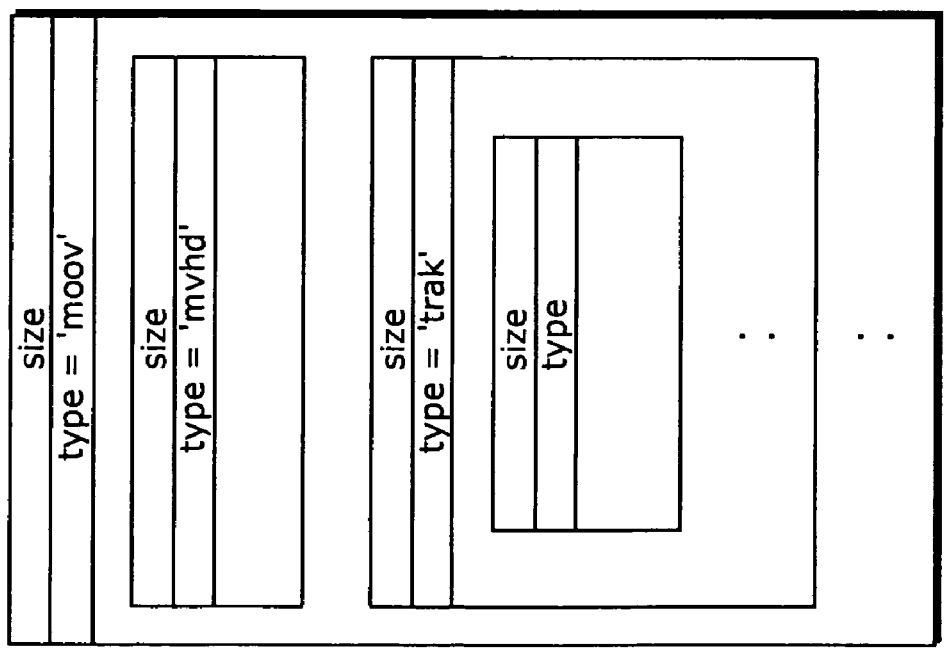
Figure 5:
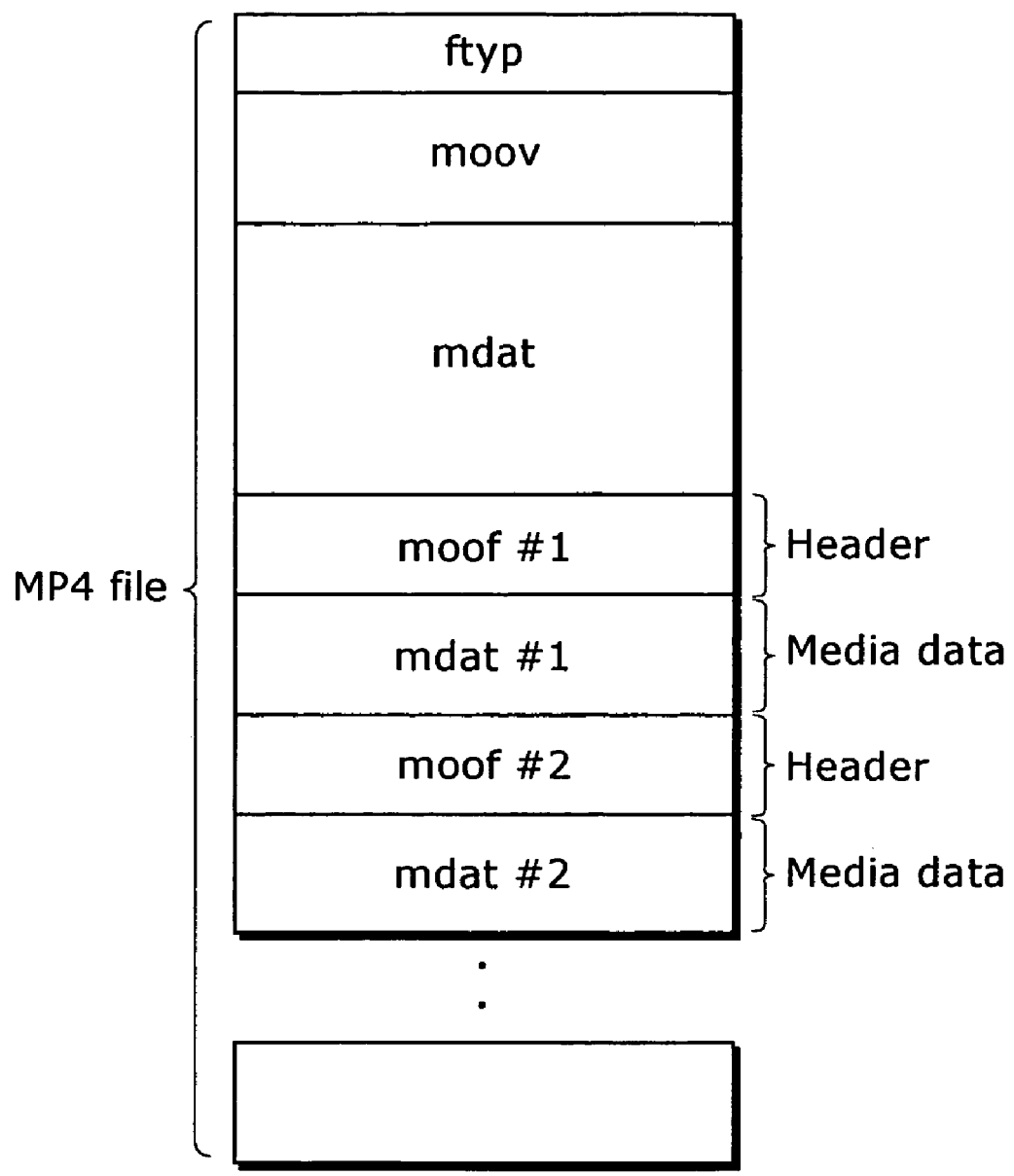
FIG. 5 is a diagram showing the use method of 'moof' in the MP4.
Figure 6:
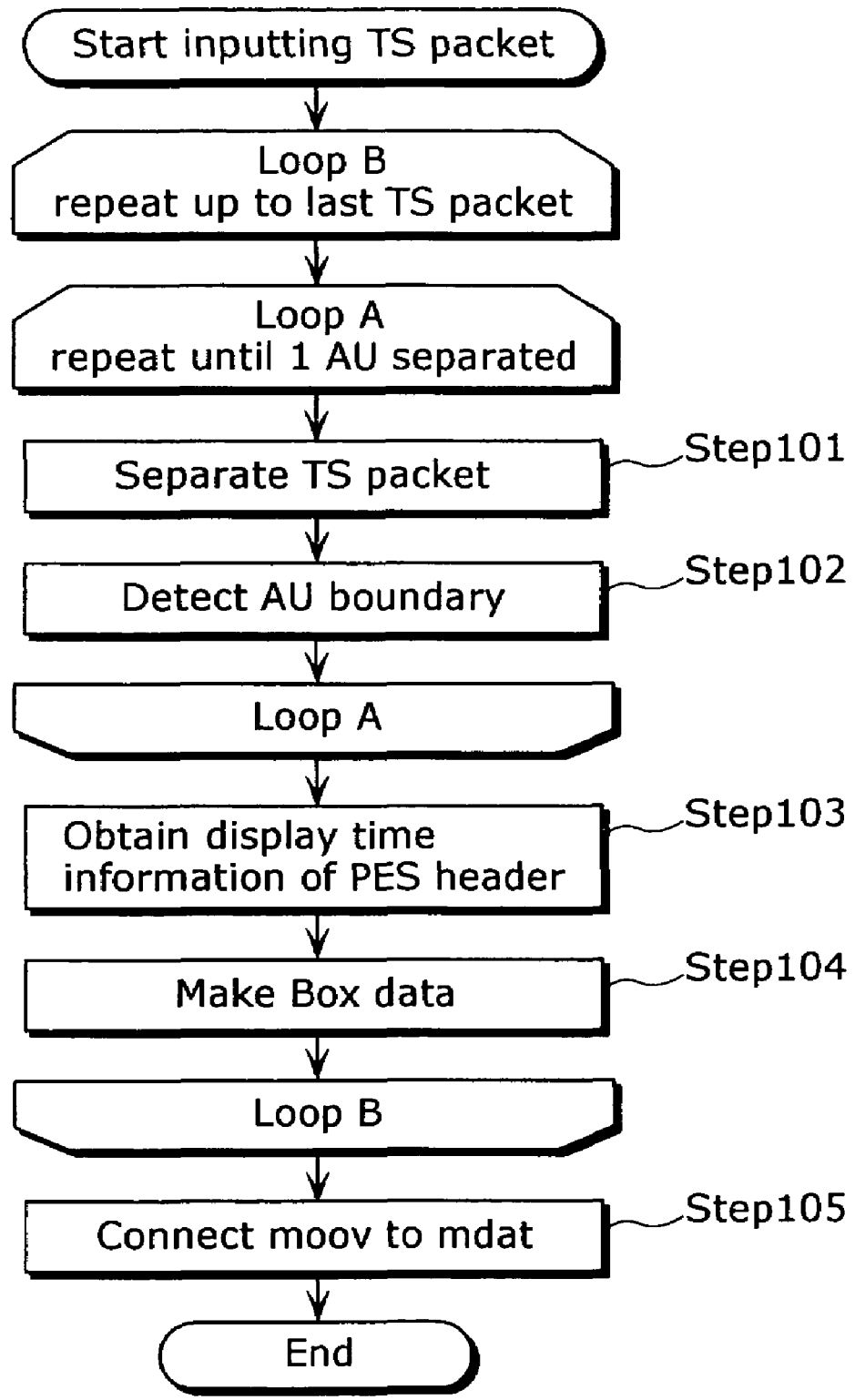
FIG. 6 is a flow chart showing the operation of a conventional multiplex scheme conversion apparatus.
Figure 7:
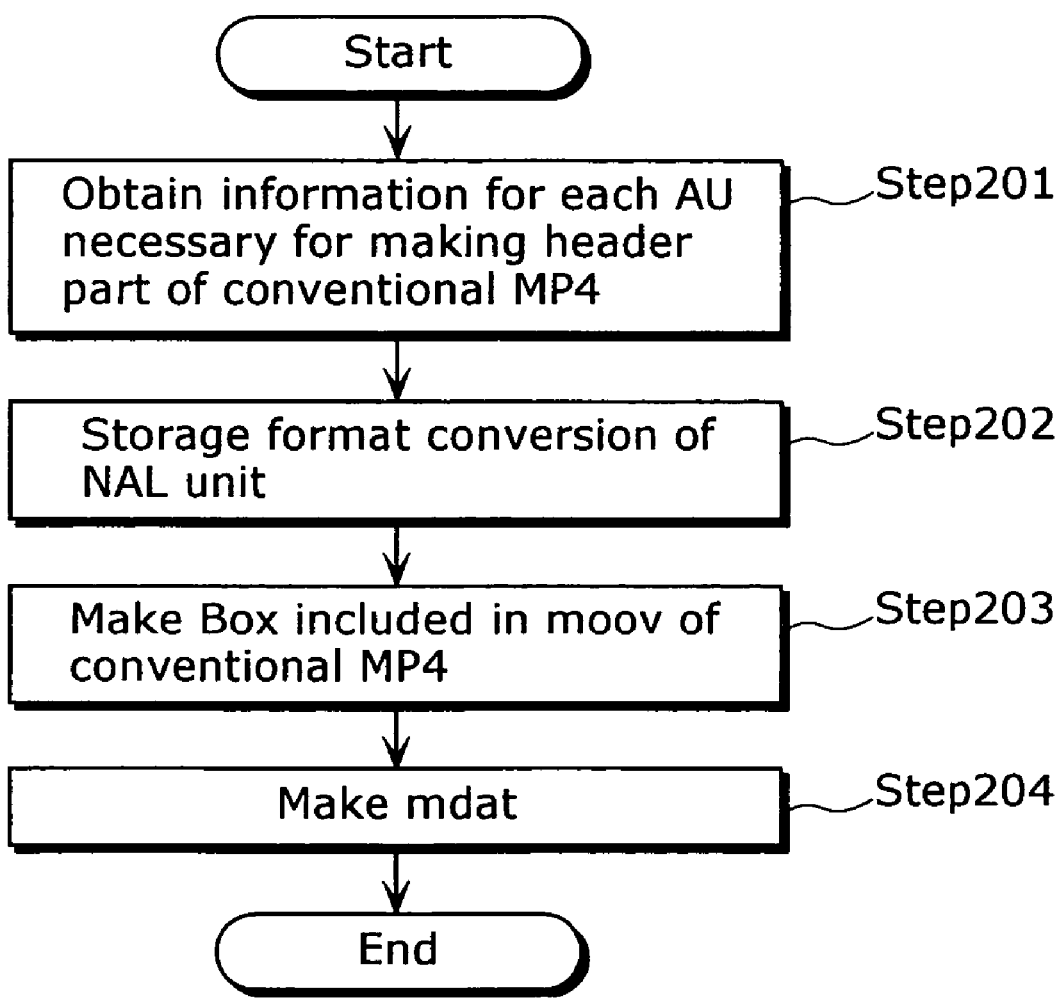
FIG. 7 is a flow chart showing the operation for making an MP4 file in the conventional multiplex scheme conversion apparatus.
Figure 8:
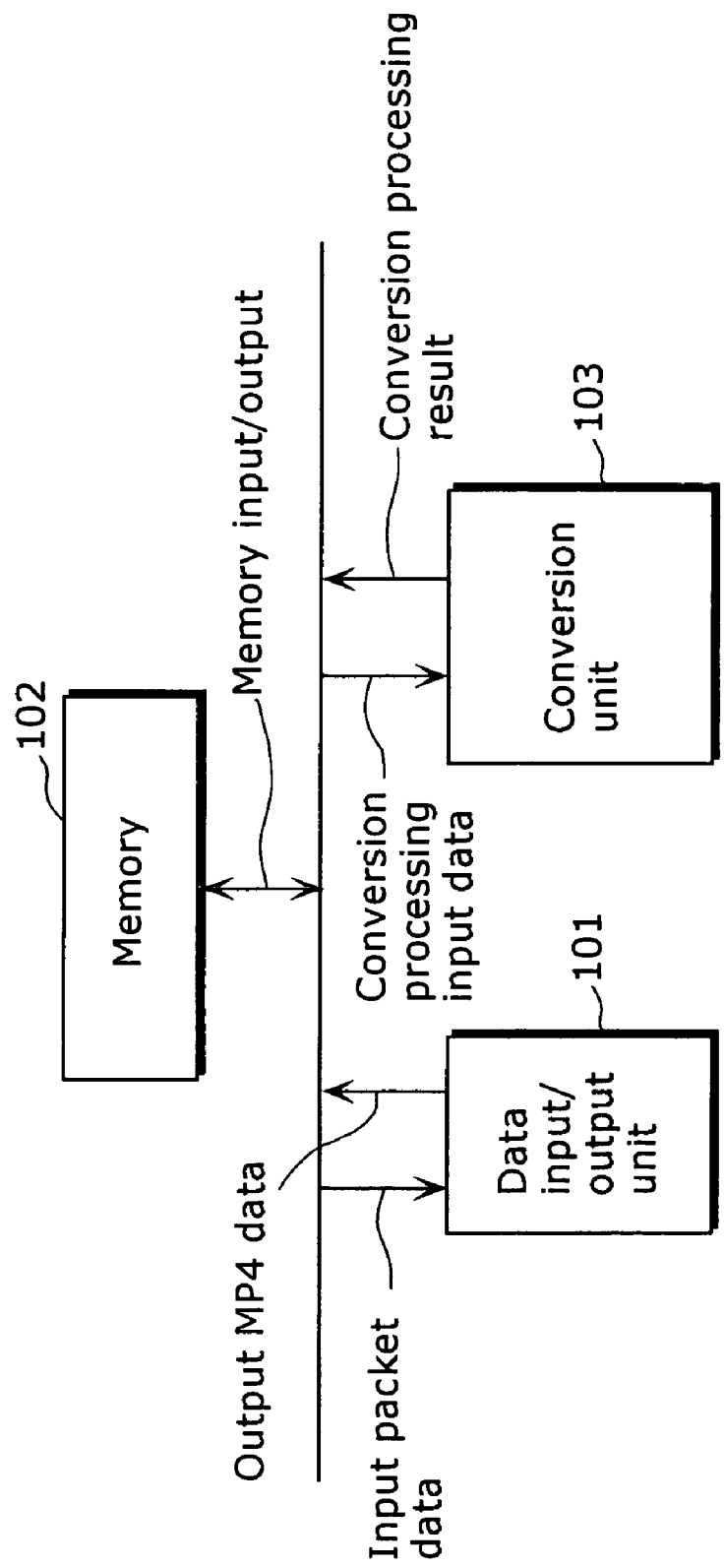
FIG. 8 is a block diagram showing the whole structure of a multiplex scheme conversion apparatus in a first embodiment of the present invention.

FIG. 8 is a diagram showing the whole structure of a multiplex scheme conversion apparatus. The apparatus is composed of a data I/O unit 101 and a conversion unit 103. The data I/O unit 101 inputs TS packet data to store the data in a memory 102 and outputs the MP4 file for which multiplex scheme is converted, and the conversion unit 103 that obtains the TS packet data from the memory 102, separates and analyzes the AU data and the header of a PES packet, stores the analysis result in the memory 102, converts the separated AU data into an MP4 using the analysis result, and outputs the conversion processing result to the memory 102. Here, the memory 102 includes a storage region of input and output data and a work region that temporally stores the conversion processing result or the AU data, and the sizes of the respective regions are changeable. Also, the restructure unit 103 is a CPU here, but it can be exclusive hardware. Operations of the conversion unit 103 will be described in detail below.

Figure 9:
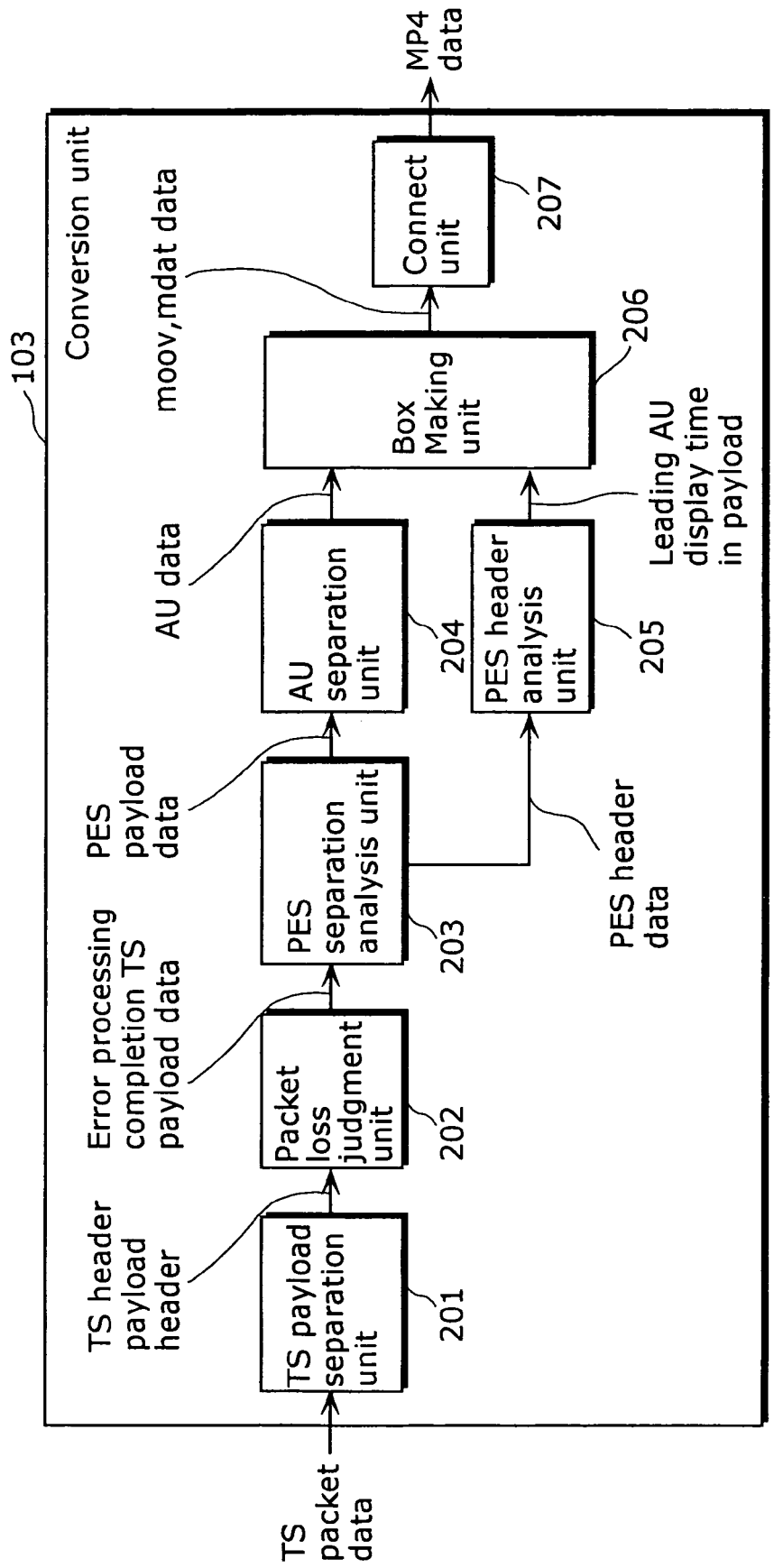
FIG. 9 is a block diagram showing the structure of a conversion unit 103 in the multiplex scheme conversion apparatus in the first embodiment of the present invention.

FIG. 9 is a block diagram showing the structure of the conversion unit 103. The conversion unit 103 includes a TS payload separation unit 201, a packet loss judgment unit 202, a PES separation analysis unit 203, an AU separation unit 204, a PES header analysis unit 205, a Box making unit 206 and a connection unit 207. The TS payload separation unit 201 separates the header of a TS packet and the payload and outputs them to the packet loss judgment unit 202. The packet loss judgment unit 202 judges a loss of a TS packet, performs error processing in the case where a packet loss is detected and outputs, to the PES separation analysis unit, the payload data on which error processing has already been performed. The procedure of the judgment on whether or not a packet loss has occurred is as follows: (i) obtaining continuity_counter value from the TS header; comparing the value with continuity_counter value of the TS packet inputted immediately before; and (iii) judging that a packet loss has occurred in the case where these values are discontinuous. Here, the maximum value of continuity_counter is 15, and in the case where the continuity_counter value of a TS packet inputted immediately before is 15 and the continuity_counter value of current TS packet is 0, it is judged that continuity_counter values are cycled and there is no packet loss. In contrast, in the case where a packet loss is detected, a NAL unit whose NAL unit type is 25 and whose payload is vacant is inserted, as information for notifying the presence of a packet loss, in the top of the payload data of current TS packet employing a byte stream format. Note that the NAL unit type of the NAL unit to be inserted can have an arbitrary value between 24 and 31 inclusive on condition that the NAL unit type is not used for other purposes. Here, the NAL unit type of 0 and between 24 and 31 inclusive are defined as areas that can be arbitrary used by an application in the AVC standard. Also, as the information for notifying the presence of a packet loss, a code pattern that does not appear in the AVC stream may be inserted and the packet loss information may be managed separately from the stream. Next, the PES separation analysis unit detects the starting position of the PES packet by searching the start code of the PES packet in the MPEG-4 AVC from the payload data of the TS packet into which the NAL unit for notifying the presence of a packet loss is inserted, the start code being between 0x000001E0 to 0x0000001EF inclusive. Here, in the case where a field indicating the size of a PES packet is included in the header of the PES packet, the payload may be separated using the size. After the PES packet is separated, the PES packet is divided into the header and the payload, and the header data is outputted to the PES header analysis unit 205 and the payload data is outputted to the AU separation unit 204. Note that the stuffing data in the PES packet is not included in the payload data. In the AU separation unit 204, the boundary of AUs is detected from the payload data of the PES packet and the AU data is separated, and the separated AU data is outputted to the Box making unit 206. Here, in the case where a NAL unit for notifying the presence of a packet loss is inserted by the packet loss judgment unit, a NAL unit for notifying the presence of a packet loss is also included in the AU data to be outputted to the Box making unit 206. The PES header analysis unit 205 judges whether the display time of the leading AU that starts in the PES payload is included in the data of the inputted PES header, and when included, the display time of AU is outputted to the Box generation unit 206. Next, the Box making unit 206 makes 'moov' and 'mdat' including packet loss information based on the inputted AU data and the display time in the PES header, and outputs them to the connection unit 207. Note that the Box making unit 206 may make 'moof' or 'mfra' in addition to 'moov' and 'mdat'. Lastly, the connection unit 207 connects 'moov' with 'mdat' and outputs it as the data of the MP4 file.

Figure 10:
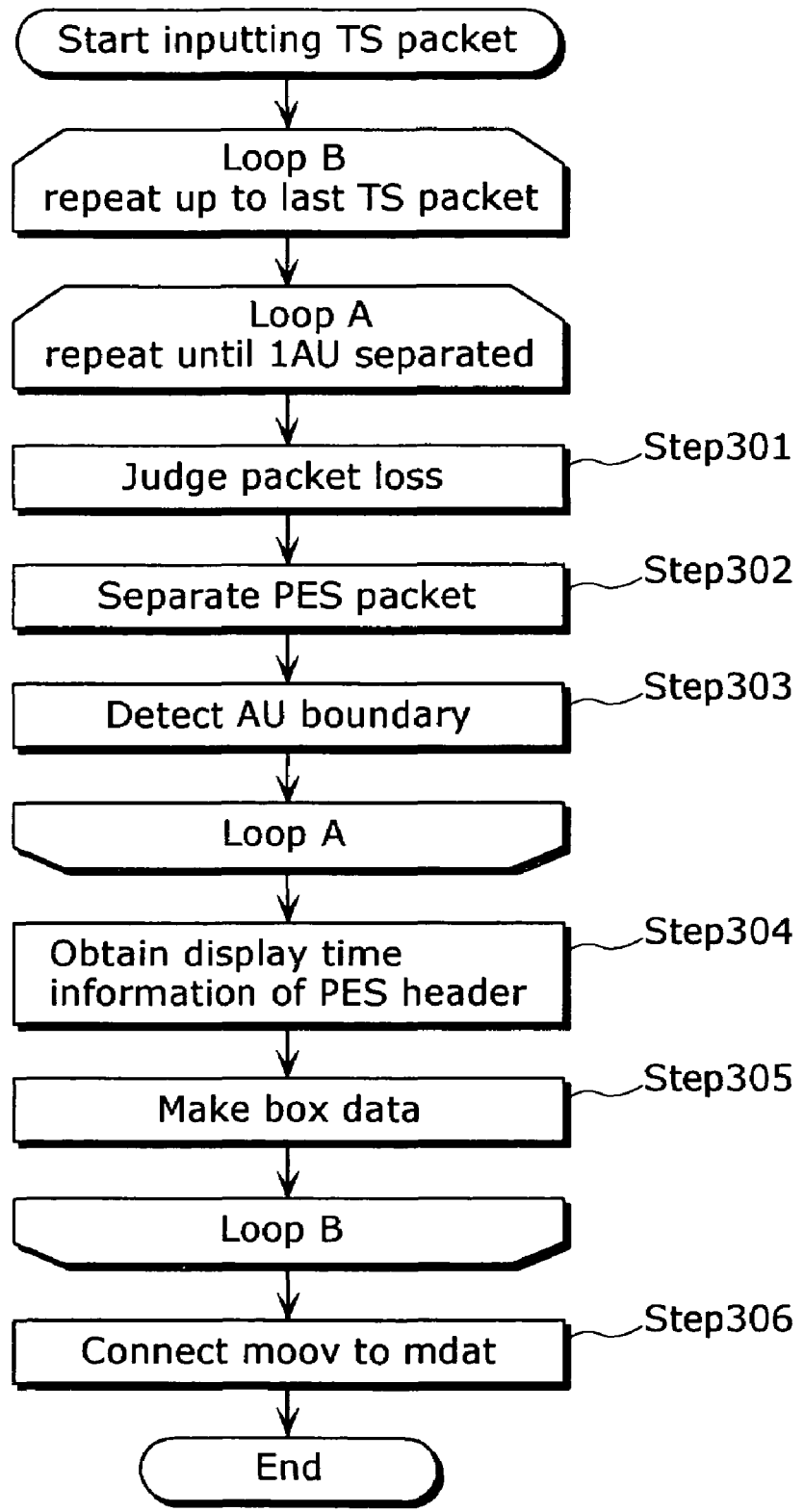
FIG. 10 is a flow chart showing the operation of the multiplex scheme conversion apparatus in the first embodiment of the present invention.

FIG. 10 is a flow chart showing the operation of the conversion unit 103. First, judgment on whether a loss of TS packet occurred is made in the step 301, and in the case where the occurrence of the packet loss is detected, a NAL unit for notifying the presence of a packet loss is inserted in the position at which a packet loss has been detected. Consequently, the header and the payload of the PES packet are separated from each other in the step 302, and the boundary of AUs is detected from the payload of the separated PES packet and the AU data is separated in the step 303. As shown in the Loop A of FIG. 10, the operations from step 301 to step 303 are repeated until the data for 1 AU can be separated. After the data for 1 AU is separated, in the step 304, the header of the PES packet is analyzed, judgment on whether the display time of the leading AU that starts in the PES payload is included is made, and when included, the display time of the AU is obtained. Note that the processing of step 304 may be performed in the processing of Loop A. Next, in the step 305, the Box data in the MP4 file is made based on the AU data separated in the Loop A and the display time information obtained in the step 304. The processing of Loop B is repeated until the processing of all the AU data included in the TS packet to be inputted is completed, 'moov' and 'mdat' are completed at the time when the processing of all the AU data is completed, and in the step 306, 'moov' and 'mdat' are connected with each other, and the MP4 file is outputted. Here, the Loop B includes processing of Loop A, step 304 and step 305. Note that 'fytp' is made, added to 'moov', and then outputted in the step 305 or added to 'moov' in the step 306. Note that an MP4 file where fragments are used may be outputted. In this case, in the step 305, at the time when 'moof' and 'mdat' for one fragment are determined, 'moof' and 'mdat' are outputted to finish Loop B, the outputted 'moof' and 'mdat' are sequentially connected with each other in the step 306. In addition, at the time of using fragments, it is possible to store, in 'moof', the header information of all the samples in a media track and also store, in 'moov', the header information of the sample placed in the top of a 'trak'.

Figure 11:
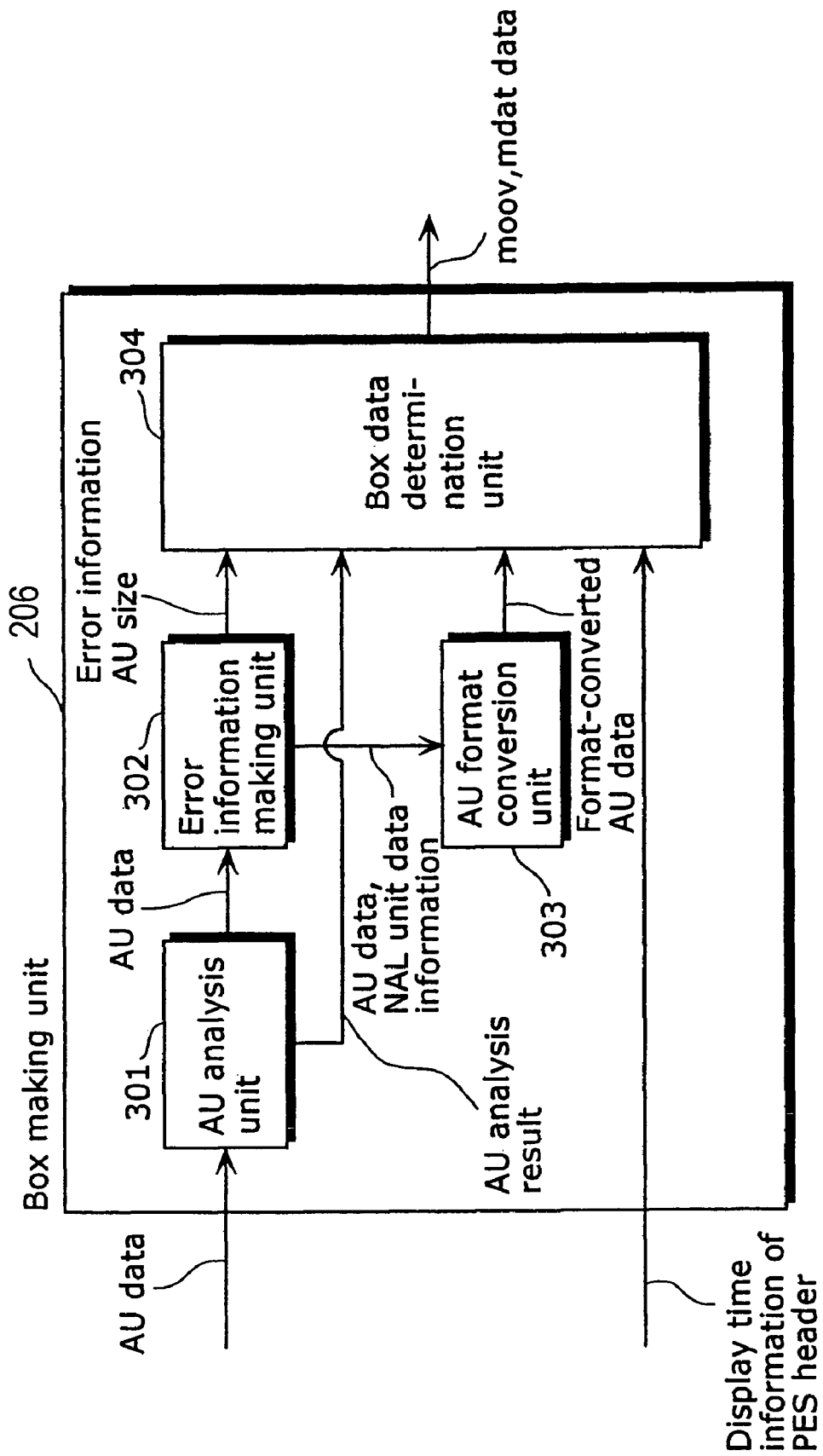
FIG. 11 is a block diagram showing the structure of a Box data determination unit in the multiplex scheme conversion apparatus in the first embodiment of the present invention.

The structure and operations of the Box making unit 206 will be described in detail. Note that the NAL unit included in the payload of a TS packet is simply described as a NAL unit from here, and it does not mean the NAL unit for notifying the presence of a packet loss. FIG. 11 is a block diagram showing the structure of the Box making unit 206. The Box making unit 206 includes an AU analysis unit 301, an error information making unit 302, an AU format conversion unit 303, and a Box data determination unit 304. First, the AU analysis unit 301 analyzes the AU data, obtains the information necessary for making a Box composing a conventional MP4 file, and outputs the analysis result to the Box data determination unit 304, such information being the display time of an AU, whether or not it is the AU IDR and the like. Here, the analysis result outputted by the AU analysis unit 301 does not include the size of the AU. Also, in the Box composing a conventional MP4 file, a Box indicating error information (loss information) or identification information for indicating the error information in 'mdat' is not included.

The operation that is performed in the case where AU time information, an SPS or an PPS data that are referred to in decoding AU data is lost because of a packet loss will be described below. As to the AUs whose decoding time or display time cannot be obtained from the header information of the PES packet, the data of AU is analyzed and then the time information is obtained. To be more specific, the parameter indicating the display order of pictures called Picture order count or SEI such as the Picture timing SEI and the Buffering period SEI are analyzed. In the case where the information indicating that these pieces of time information are lost because of packet losses, the decoding time or display time of each AU is calculated according to a predetermined method. In the case where a SPS or a descriptor information transmitted by TS packets having a PID different from coded media data indicate that the frame rate is fixed, the decoding time or display time may be determined based on the frame rate. Note that the descriptor is supplementary information of the coded media data that is described in the MPEG-2 system standard. Next, in the MP4, SPSs and PPSs are stored in a sample entry in the sample description box ('stsd') or a 'trak' for a parameter set. Further, (i) a sample in the 'trak' of the MPEG-4 AVC and (ii-i) each sample entry that stores an SPS and a PPS that are referred to by the sample or (ii-ii) each sample of the 'trak' in a parameter set are associated with each other one by one. Therefore, in the case where the data of an SPS or a PPS that is referred to in decoding a sample is lost, the same SPS or the PPS used in decoding the immediately-before-sample is referred to instead. Note that the default SPS or PPS that is previously set may be used.

In the error information making unit 302, a NAL unit for notifying the presence of a packet loss is searched among AU data, and in the case where such NAL unit is detected, a Box data indicating error information is made. Further, the NAL unit data to be stored in 'mdat' is determined based on the presence or absence of the packet loss in the data of the NAL unit composing AUs, and it is determined that the size of AU data composed of NAL unit data is stored in 'mdat' as sample data. After that, those pieces of information are outputted to the Box data determination unit 304 together with the Box data indicating error information. In the AU format conversion unit 303, in the error information making unit, the data of the NAL unit in the AU to be stored as sample data is converted from the byte stream format to the NAL size format, and the resulting AU data is outputted to the Box determination unit 304. Here, the converted AU data outputted in the Box determination unit 304 becomes sample data in the MP4.

Figure 12:
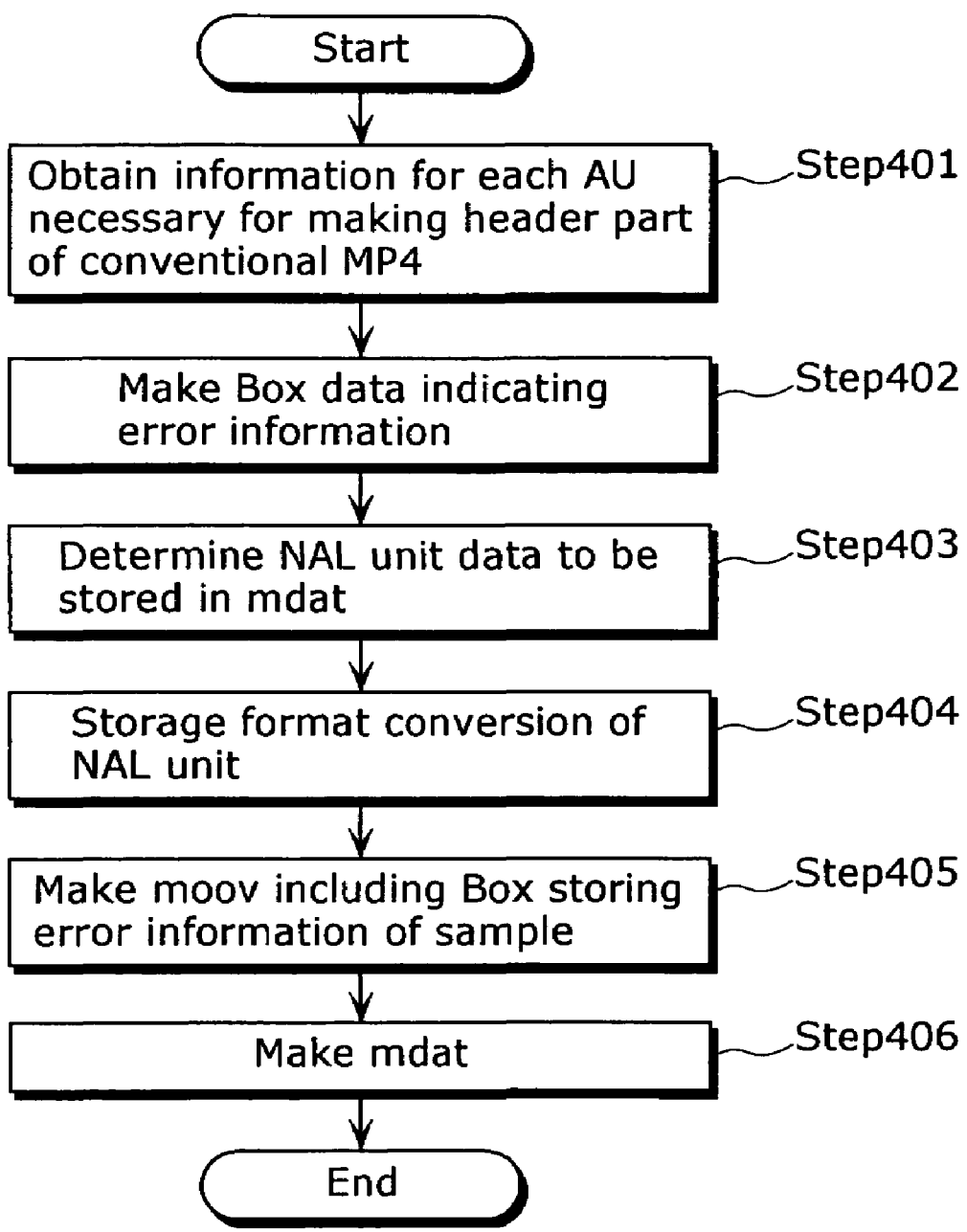
FIG. 12 is a flow chart showing the operation of a Box making unit 206 in the multiplex scheme conversion apparatus in the first embodiment of the present invention.
Figure 13:
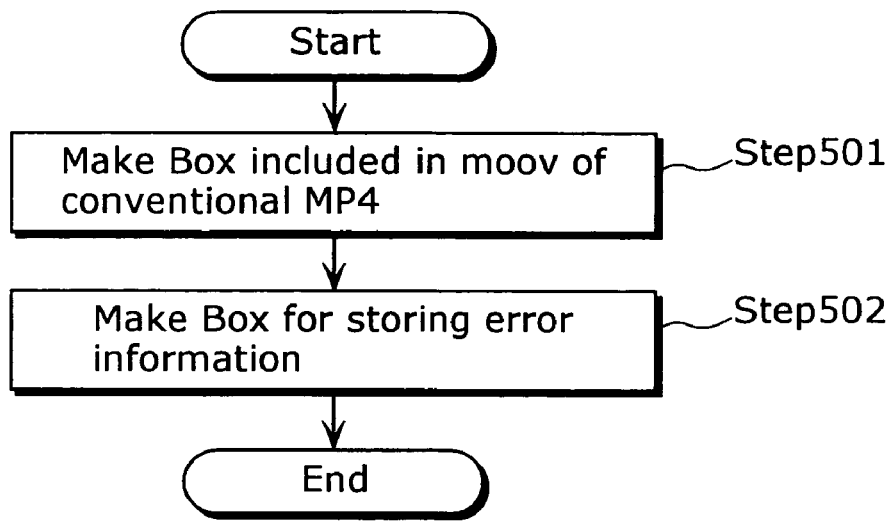
FIG. 13 is a flow chart showing the operation for making the header part of an MP4 by the Box making unit 206 in the multiplex scheme conversion apparatus in the first embodiment of the present invention.

FIG. 12 is a flow chart showing the operation of the Box making unit 206. First, in the step 401, the information necessary for making Boxes composing a conventional MP4 file is obtained from the inputted AU data. In the step 402, Box data indicating error information is made by detecting a NAL unit for notifying the presence of a packet loss from AU data. Further, in the step 403, the NAL unit data to be stored as sample data in the MP4 file is determined. In the step 404, the NAL unit data which is determined as sample data is stored in the step 403 is converted to a NAL size format, and the converted NAL unit data composes a sample data is made. Consequently, in the step 405, the 'moov' data including the Box indicating error information is made. In the step 406, 'mdat' data that stores sample data made in the step 404 is made. FIG. 13 is a flow chart showing the operation of step 405. In the step 404, a Box composing a conventional MP4 file is made in the step 501 first, and next, a Box for storing error information is made in the step 502.

Figure 14:
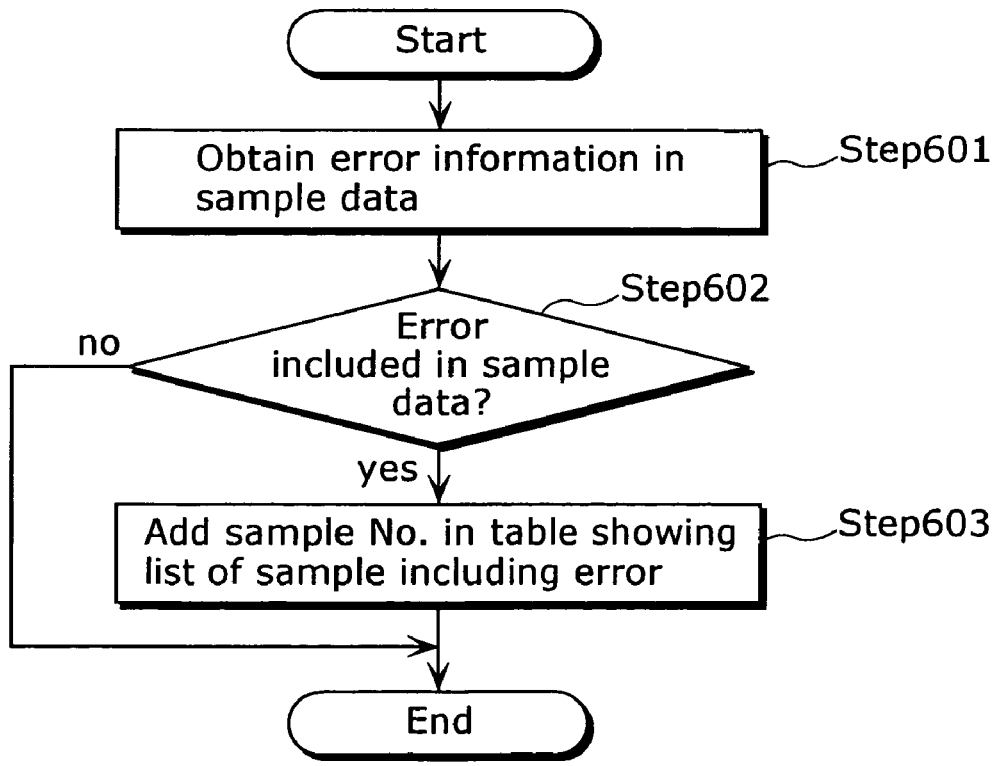
FIG. 14 is a flow chart showing the operation of making an Error sample box in the multiplex scheme conversion apparatus in the first embodiment of the present invention.

Next, in the step 402, the procedure taken at the time of making a Box data showing the error information will be described. FIG. 14 is a flow chart showing the operation of step 402. Here, a technical word of sample is used for describing the Box data making method in the MP4 file, and one sample means 1 AU. First, in the step 601, search for judging whether a NAL unit for packet loss notification is included in AU data is performed. In the search, the starting position of a NAL unit is detected by checking starting from the leading data of an AU in order a start code prefix (0x000001, 3 bytes) of a byte stream format in a byte align position. Consequently, the NAL unit type of the detected NAL unit is obtained, and in the case where the resulting value of the NAL unit type is a predetermined value, the NAL unit is judged as a NAL unit for notifying the presence of a packet loss. After the NAL unit types of AUs are checked up to the last one in order, judgment on whether or not a NAL unit for notifying the presence of a packet loss is detected in a sample is made in the step 602. The processing of step 603 is performed in the case where a NAL unit for notifying the presence of a packet loss is detected, in contrast, in the case where a NAL unit for notifying the presence of a packet loss is not detected, the Box data making processing is completed. In the step 603, the sample numbers of samples are added to a table showing a list of samples including an error. Operations performed in the step 601 to step 603 will be described below with reference to concrete examples as FIGS. 15A to 15D. FIG. 15A is the diagram of sample data in the coded data of AVC, in the diagram, the sample data are placed in a decoding order and, the numbers in the figure show sample numbers respectively. In this example, a NAL unit for notifying the presence of a packet loss is detected in the NAL unit data in the samples whose sample numbers are 7, 9 and 15. As to samples whose sample numbers are 1 to 15, the procedure taken at the time of making a Box indicating error information will be described below. Note that the name of the Box indicating error information is Error sample box. First, as a NAL unit for notifying the presence of a packet loss is detected in the step 601 as to first to sixth samples, it is judged in the step 602 that a NAL unit for notifying the presence of a packet loss is not present in a sample, and the processing is completed without updating the table data of Error sample box. As a NAL unit for notifying a packet loss is detected in the seventh sample in the step 601, it is judged in the step 602 that the table data of Error sample box is updated, and the update processing is performed in the step 603. In the step 603, a sample number 7 is stored by adding the entry of a table in order to indicate that a packet loss is included in the seventh sample. The same processing is performed on the following samples, and the sample number 9 and the sample number 15 are added to the table. As a result, numbers of 7, 9 and 15 are stored, as the numbers of samples including a packet loss, in the table of Error sample box as shown in FIG. 15B. FIG. 15C is a syntax example of Error sample box, and error_sample_number shows the sample number of a sample whose NAL unit data is partly lost because of a packet loss. The Error sample box is placed immediately below 'stbl' in trak in 'moov', and it is placed immediately below a track fragment run box ('traf') in 'moof', but it may be placed immediately below one of the other Boxes. Here, an Error sample Box is made only in the case where a sample whose data is lost is present in a media track, but an Error sample box whose entry is vacant may be made even in the case where a sample whose data is lost is not present. Note that, at the time of placing Error sample boxes in traf, these samples are given an error_sample_number obtained by counting these samples starting from the leading sample whose sample number is 1, the leading sample being included in 'traf'. For example, in the case indicating that ten samples are included in 'traf' and that the data of third and fifth samples are lost because of packet losses, two entries are made, one of which being assigned 3 and the other one of which being assigned 5 as its error_sample_number. Also, it is possible to add a flag indicating that data in a sample is lost because of a packet loss to tr_flags in a track fragment run box ('trun'), the tr_flags being a field indicating flag information concerning the header information of each sample.

Further, whether or not the data in a sample is lost because of a packet loss is shown in the above explanation, but whether or not the data is lost in a specific NAL unit of a sample may be shown. For example, in the MPEG-4 AVC, whether or not the data is lost in the NAL unit data of a slice, an SPS or a PPS is shown. This is because a correct decoding result can be obtained under the condition that slices and parameter sets to be referred to by the slice are completely available. To be more specific, as to a NAL unit of a parameter set, whether or not the data of an SPS or a PPS that is necessary for decoding slice data of a sample is lost may be shown. Also, as a syntax shown in FIG. 15D, the information for identifying a NAL unit whose data is partly lost may be stored. In the figure, error_nal_unit_number is a number for identifying a NAL unit whose data is lost, and in the case where the second and the fourth NAL units in a sample are lost, two entries whose error_nal_unit_numbers are 2 and 4 respectively are assigned. In the entries, a NAL unit type may be shown. Further, an error_nal_unit_number is used for identifying a video packet in the MPEG-4 visual or a slice in H.263.

Also, in the case where the information on not only a packet loss but also a bit error may be obtained, it is possible to store the information for identifying a sample or a NAL unit whose sample data includes a bit error.

Figure 16:
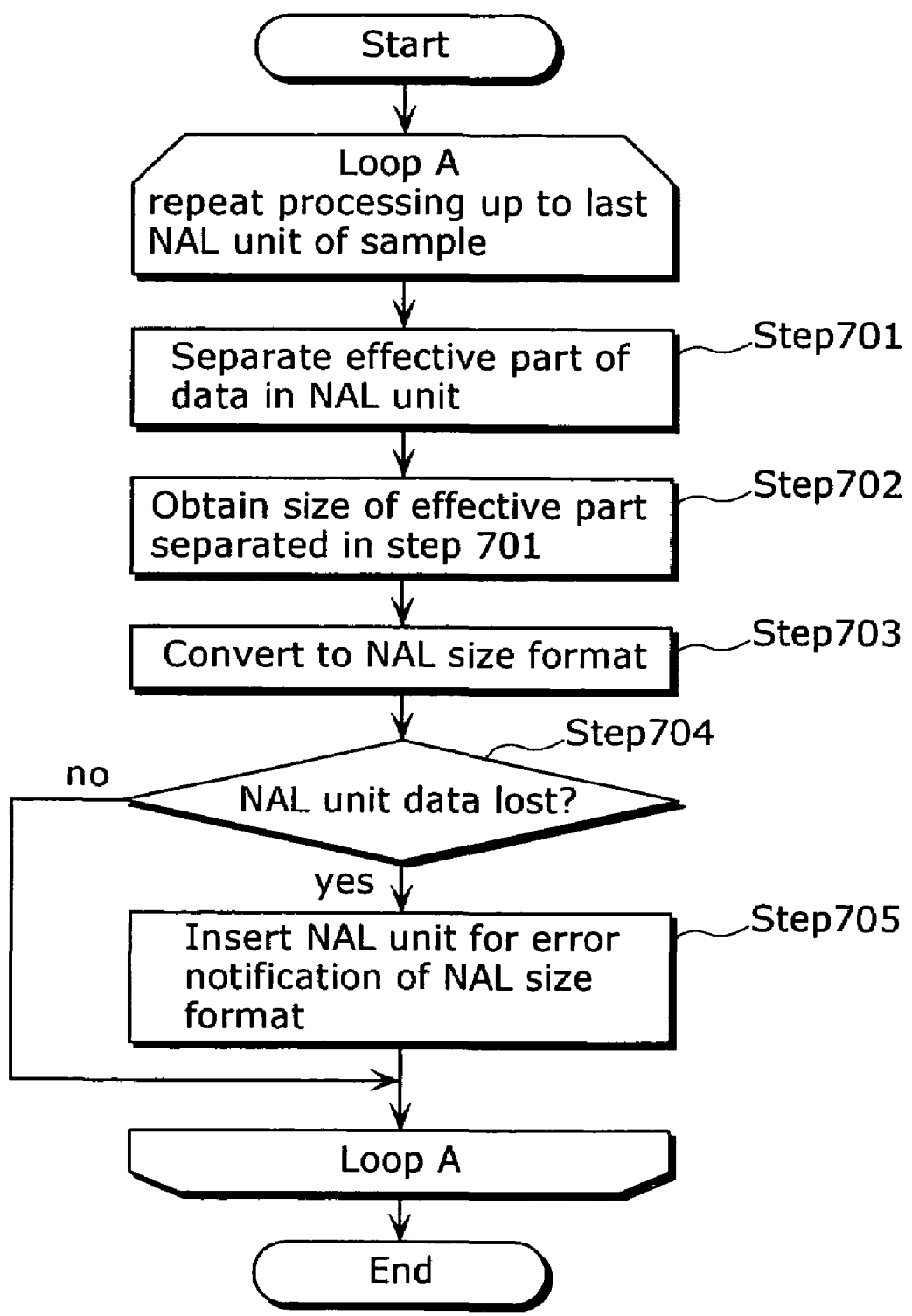
FIG. 16 is a flow chart showing the method of determining sample data in the multiplex scheme conversion apparatus in the first embodiment of the present invention.

Next, operations, which are performed in the steps 403 and 404 respectively, of determining a NAL unit data to be stored as a sample data in the MP4 file and converting the storage format of the NAL unit to the NAL size format will be described below with reference to the flow chart of FIG. 16. First, in the step 701, valid data in each NAL unit in an AU is determined and separated. Here, in the case where a NAL unit for notifying the presence of a packet loss is detected, such valid data in the NAL unit whose starting position has already been detected immediately before is determined as the data up to immediately before the NAL unit for notifying the presence of a packet loss. In this case, the data of NAL units that follow the detected NAL unit for notifying the presence of a packet loss becomes invalid, in other words, the presence of NAL units placed before the next NAL unit whose starting position is to be detected becomes invalid. This is because there is a case where the NAL unit to which the data including an invalid part cannot be specified, or because, even if specified, the size of the lost data is unknown and the data cannot be used in decoding. In the case where NAL unit for notifying the presence of a packet loss is not detected, all the NAL unit data is regarded as valid data. Note that zero_byte and a start code prefix are not included in the NAL unit data separated as valid data. Next, the size of the valid data separated in the step 701 is obtained in the step 702. In the step 703, the NAL unit data including the valid data is converted to the NAL size format based on the size obtained in the step 702. Here, the size of the field (identification information) indicating the size of the NAL unit is variable within the range of 1 to 4 in the NAL size format, but the field size is regarded as given previously. Next, whether the NAL unit data is lost or not is judged in the step 704, and in the case where it is lost, a NAL unit for error notification is inserted as a NAL size format. The processing from the above step 701 to step 705 (Loop A) is repeated until the processing of the last NAL unit in a sample is completed. Note that the size of a sample is determined at the time when the size of the last NAL unit in the sample is determined.

Also, whether the data of a sample is lost or not is shown only in the Box indicating error information stored in 'moov' or 'moof', and a NAL unit for notifying the presence of a packet loss may not be inserted into the sample data to be stored in 'mdat'. At this time, the steps 704 and 705 become unnecessary.

Also, it is possible to store all the NAL unit data included in the payload of a TS packet may be stored without throwing away the data that has been judged as invalid. Further, in the case where the size of the data that is lost because of a packet loss can be specified, a specific NAL unit (called a NAL unit for complementing a packet loss from here) for stuffing the lost part may be inserted. A NAL unit type that is in an unspecified region and is assigned, as its NAL unit type value, a number different from the one for notifying the presence of a packet loss is used in the NAL unit for complementing a packet loss. Also, the error information may be shown only in the NAL unit for error notification, and an Error sample box may not be made.

Also, in the case where the packet loss information in the NAL unit data in an AU is provided separately from the NAL unit for notifying the presence of a packet loss, the valid data in the NAL unit is determined based on the information separately shown in the step 701.

FIG. 17 and FIG. 19 respectively show a concrete example of determining valid NAL unit data and converting it to the NAL size format. In each diagram, SCP, Nal_len, ERR_NALU is a start code prefix in a byte stream format, the size of a field showing the size of a NAL unit in the NAL size format, and a NAL unit for error notification respectively. FIG. 17 is an example where NAL unit data because of a packet loss occurs without crossing a NALU boundary. FIG. 17A shows before-conversion AU data. The AU is composed of four NAL units of NALU #1 to NALU #4, and a packet loss occurs in the third NAL unit. The NALU #3 is basically composed of data in the regions shown in the figure as "receive 1", "lost" and "receive 2", but ERR_NALU is inserted immediately after the data of the "receive 1" because a "lost" region is lost because of a packet loss. At this time, as only the data of "receive 1" part is judged as valid data in NALU #3, only the data of "receive 1" part is stored as the sample data of 'mdat'. As the data size of the "receive 1" part is size3_1, the NAL_len field value is size3_1 at the time when converting the data of NALU #3 to the NAL size format. Next, immediately after the NALU #3, ERR_NALU of the NAL size format is inserted. FIG. 17B shows the structure of AU data outputted after conversion. Note that the data structure of AU at the time of storing all the NAL unit data included in the payload of a TS packet without inserting a NAL unit for error notification is shown as FIG. 17C, and the size of NALU #3 is the total of size3_1 and size3_2 (the size of "receive 2").

FIG. 18 is an example where NAL unit data is lost because of a packet loss crossing the boundary of NAL units. FIG. 18A shows before-conversion AU data. The AU is composed of four NAL units of NALU #1 to NALU #4, and the data is lost crossing a NAL unit, more specifically, from the ending part of NALU #2 to the leading part of NALU #3 (the data of the region shown as "lost" in the figure). At that time, the data of "receive 1" part in the figure becomes valid in NALU #2. Next, as to NALU #3, the data immediately after ERROR_NALU to the data up to the starting position of NALU #4 becomes invalid because the starting position of a NAL unit cannot be detected. As a result, the data of NALU #3 is not stored in the sample data. In other words, the data of "receive 2" part in the figure becomes invalid. FIG. 18B shows the structure of AU data outputted after conversion.

FIG. 19 is an example where NAL unit data is lost because of a packet loss crossing the boundary of AUs. FIG. 19A shows before-conversion AU data. Three AU data from AU #1 to AU #3 are composed of NALU #1 to NALU #4, NALU #5 to NALU #8 and NALU #9 to NALU #12 respectively. Here, data from the middle of NALU #4 to the leading part of NALU #9 is lost crossing AU #2 (the data of a region shown as "lost" in the figure). The valid data in AU #1 to AU #3 is described below. In AU #1, all the data from NALU #1 to NALU #3 and the data of nal4_size obtained in NALU #4 become valid. As all the AU #2 data is lost, there is no valid data. Therefore, in the MP4 file, a sample for storing AU #3 will be stored next to the sample for storing AU #1. At this time, as a reproduction duration of a sample for storing AU #1, the total of reproduction duration of AU #1 and AU #2 is stored. Lastly, in AU #3, the data from NALU #10 to NALU #12 become valid. Here, ERR_NALU may be inserted into the leading part of NALU #10 in the case where it is possible to determine that NALU #10 is not the leading NAL unit in AU #3. For example, as it is prescribed in the MPEG-2 system standard that a NAL unit for determining the boundary of AUs called Access unit delimiter should be inserted into the top of an AU, it is possible to judge that the leading NAL unit of AU #3 is lost unless NALU #10 is the NAL unit of Access unit delimiter. FIG. 19B shows the structure of AU data outputted after conversion. FIG. 19C shows the structural example of AU data outputted at the time of using a NAL unit for complementing a packet loss. The data of AU #1 and AU #3 are the same as the data shown as FIG. 19B, but in this example, the data of AU #2 is also outputted. The output data of AU #2 includes only the NAL unit for complementing a packet loss, and the size of the NAL unit for complementing a packet loss can be estimated based on the information on whether it is the coded bit rate of the MPEG-4 AVC data and a fixed frame rate. In this way, inserting a NAL unit for complementing a packet loss makes it possible to store the sample data in the MP4 by holding the original fixed bit rate as much as possible also in the case where the data is lost because of a packet loss while video data is being coded in a fixed bit rate. Also, in the case where the stream has a fixed frame rate, making a sample composed of NAL units for complementing a packet loss makes the reproduction duration of a sample become the same, and as a result, it becomes possible to reduce the size of a table that stores the reproduction duration of the sample.

Also, in the case where the slice data of an AU is lost, the same data as the data of the AU that is placed immediately before in a decoding or displaying order is stored. In other words, it is possible to reconstruct and record the AU data by performing error concealment processing on a slice-by-slice basis. Further, it is also possible to present the information indicating that the AU data is reconstructed.

Note that it is possible to store the information on a packet loss by using a Supplemental enhancement information (SEI) message. For example, the SEI message for storing user data can be used.

Note that error information may be stored in the payload or the Error sample box of the NAL unit for error notification, such error information being the rate of data that is lost because of a packet loss, the rate of slices whose data are lost in an AU or the frequency of bit errors. Also, in the case of describing the types and the sizes of NAL units for error notification, or error information in the payload of the NAL unit, a Box for indicating the type of error information to be described may be stored in 'moov' or 'moof'.

Note that each of the above-mentioned operations becomes applicable also in the case of storing AUs as one sample by using frme_count field in the sample entry in a sample description box ('stsd').

Further, the method of making a Box for error notification or inserting a NAL unit for error notification in sample data is applicable also in the case of converting, to an MP4 file, the coded media data multiplexed by a Real-time transmission protocol (RTP) packet. In the RTP packet, judgment on whether a packet loss occurred or not can be made by checking the continuity of sequence numbers added to the headers of the RTP packets.

Also, in this embodiment, error information such as an Error sample box is added to each 'trak', but the unit for adding error information is not limited to this. For example, error information can be added on an MP4 file-by-MP4 file basis. In this case, error information can be placed immediately below 'moov'. Also, at the time of using a fragment, it may be placed in the 'moof' of the last fragment or in the Box of 'mfra' and so on. This enables notifying a user of information such as a loss rate (lost data/all data) of sample data and the rate of duration to the whole reproduction duration during which audio and video can be reproduced concurrently.

In addition, it is possible to have items for which a predetermined reproduction segment is specified are possessed in a form of a list, and add error information to each item in the play list where the reproduction order of these items are described. In the case of audio data, a song is regarded as an item and songs selected by a user are described in a selection order in this play list. Here, respective reproduction segment may be different segment in the same file, or predetermined areas of different files. In this case, referring to the play list at the time of reproduction enables obtaining information such as a loss rate of sample data for each item.

Second Embodiment

The multiplex scheme conversion apparatus concerning the second embodiment of the present invention will be described with reference to FIG. 20 and FIG. 21. The structure of the multiplex scheme conversion apparatus is approximately the same as the multiplex scheme conversion apparatus in the first embodiment, but it differs in its operation performed by the Box data determination unit 304 when making 'stss' that is the table of a Sync sample. Therefore, only the 'stss' making method will be described below.

In the multiplex scheme conversion apparatus in the first embodiment, an IDR AU is a Sync sample regardless of whether data in a sample is lost or not. However, as the Sync sample becomes the sample from which decoding is started at the time of random access processing, the Sync sample that cannot be correctly decoded may cause a problem that samples following the Sync sample in a sequence cannot be decoded correctly. Therefore, only an IDR AU whose data is not lost is made to be a Sync sample in the multiplex scheme conversion apparatus of this embodiment. This makes it possible to obtain at least a non-turbulent Sync sample at the time of starting decoding from the Sync sample.

Figure 20:
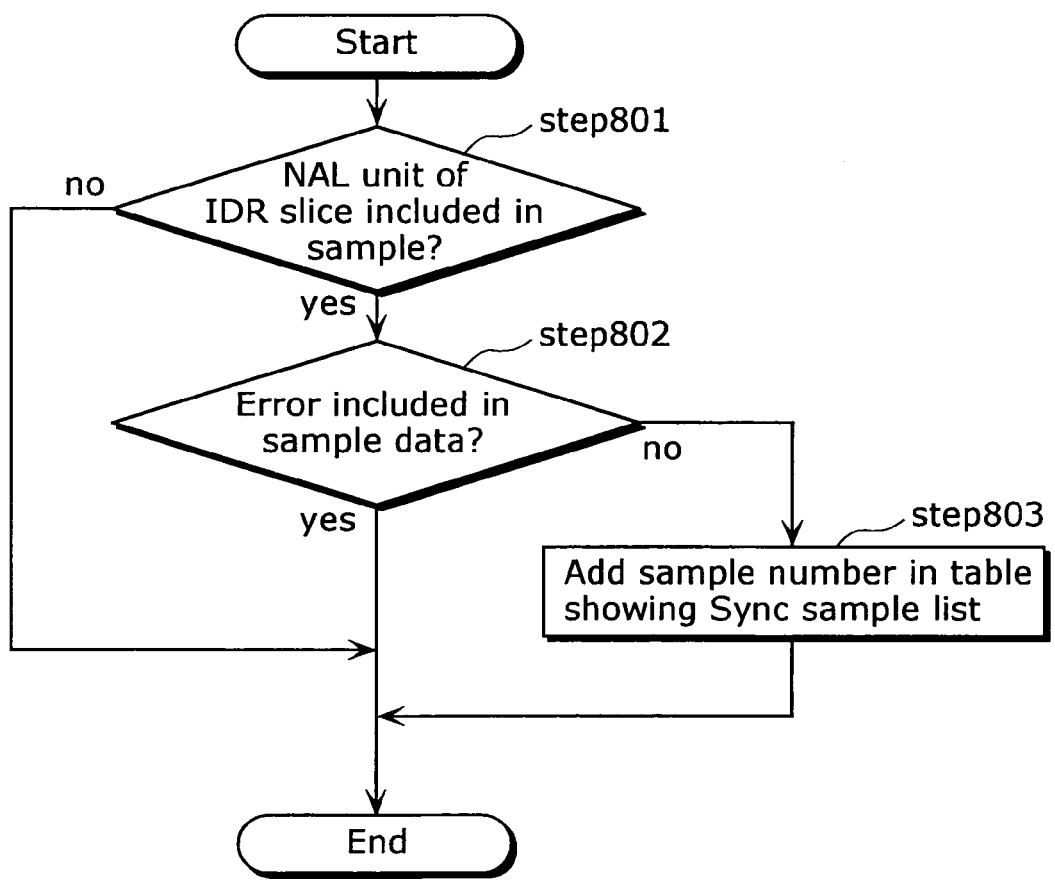
FIG. 20 is a flow chart showing the method of making a Sync sample box in the multiplex scheme conversion apparatus in a second embodiment of the present invention.

FIG. 20 is a flow chart showing the operation at the time of making 'stss' in the Box data determination unit 304. First, in the step 801, judgment on whether the NAL unit of an IDR slice is included in a sample data or not is made. Here, whether it is the NAL unit of the IDR slice or not is identified by its NAL unit type. Current processing is completed in the case where a NAL unit of the IDR slice is not included, but in the case where such a NAL unit is included, the processing of step 802 is performed. Also, in the step 802, judgment on whether a NAL unit whose data is lost because of a packet loss is included in a sample data is made based on the error information for each sample obtained in the error information making unit 302. Current processing is completed in the case where sample data is judged as lost, but in the case where sample data is judged as not lost, the sample number of the sample is added to the table of 'stss' indicating a list of Sync samples in the step 803. In this way, 'stss' is made by repeating processing of step 801 to step 803 until the last sample in a 'trak' is processed. Note that, instead of using, as Sync samples, the samples that include the NAL unit of an IDR slice and whose data is not lost, it is possible to determine Sync samples so that the differential value of reproduction starting time between Sync samples become constant as much as possible. Also, it is possible to determine, as Sync samples, samples whose data are not lost in the slice, the SPS or the NAL unit of a PPS in an AU including an IDR slice. To be more specific, it is possible to determine, as Sync samples, only in the case where the data of an SPS or a PPS that is necessary for decoding slice data of a sample can be obtained from the current sample or the samples with an earlier decoding time.

Figures 21A, 21B:
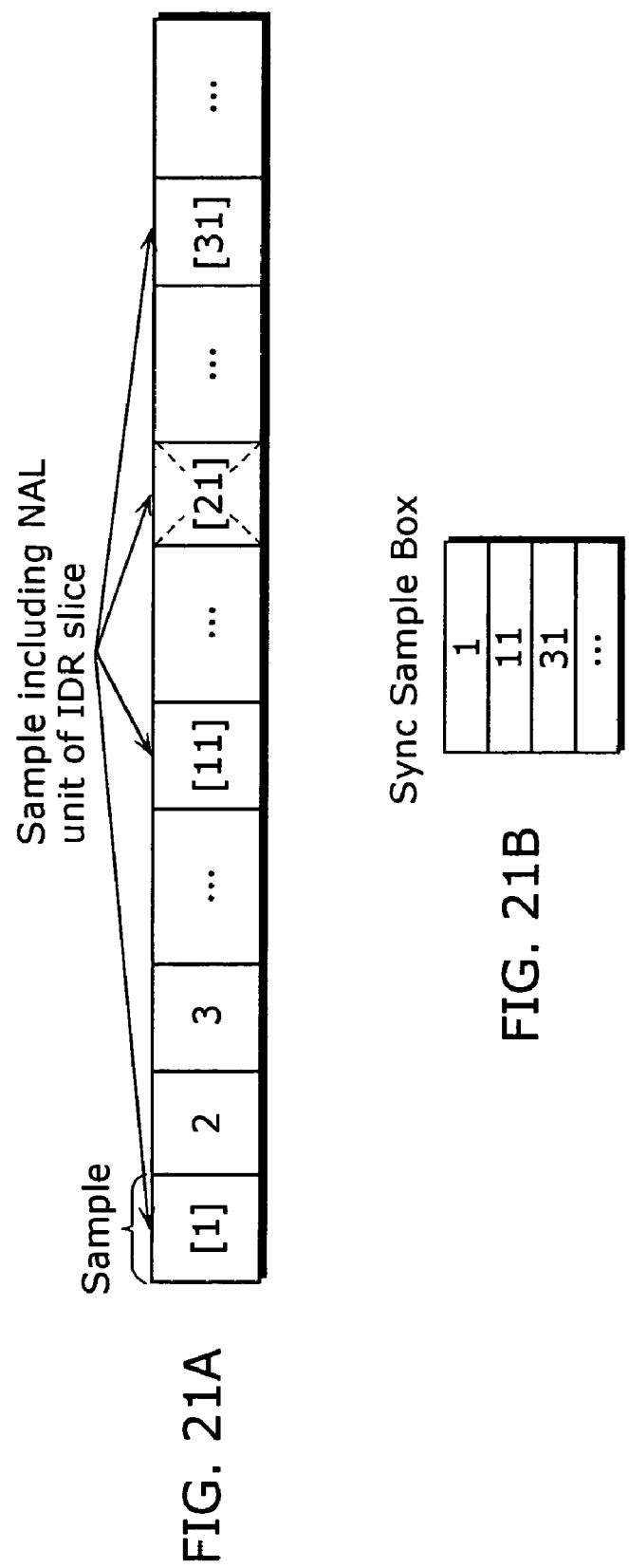
FIGS. 21A and 21B are an example procedure of making a Sync sample in the multiplex scheme conversion apparatus in the second embodiment of the present invention.

FIG. 21 shows a concrete example at the time of making 'stss' by the operation shown in the flow chart as FIG. 20. FIG. 21A shows samples aligned in the ascending order of sample numbers. The samples whose sample numbers are 1, 11, 21 and 31 include a NAL unit of an IDR slice, but the data in the sample data of the twenty-first sample is lost. At that time, the first, eleventh, twenty-first and thirty-first samples are considered as candidate Sync samples in the step 801, but in the step 802, it is determined that the twenty-first sample is not made to be a Sync sample. As a result, in the step 803, the first, eleventh and thirty-first samples are added to the table of 'stss' (FIG. 21B).

Note that samples to be recorded in 'mfra' as randomly-accessible samples can be determined in a similar way.

Note that making 'stss' using the above-mentioned method and making Error sample box can be selected independently. For example, it is possible to make 'stss' using the above-mentioned method but not to make Error sample box.

Third Embodiment

The multiplex scheme conversion apparatus concerning the third embodiment of the present invention will be described with reference to FIG. 22 to FIG. 24. The structure of the multiplex scheme conversion apparatus is approximately the same as the structure of the multiplex scheme conversion apparatus in the first embodiment, but it differs in its operation of step 402 in FIG. 12 performed by the error information making unit 302 when making a Box indicating error information of a sample. Therefore, only this operation will be described below. In the multiplex scheme conversion apparatus, a Box indicating whether up to which sample, among samples that follows the Sync sample, can be correctly decoded is made at the time when decoding is started from the Sync sample in the multiplex scheme conversion apparatus. At the time of reproducing an MP4 file made in the multiplex scheme conversion apparatus referring to this Box makes it possible to determine the sample to be displayed after the samples guaranteed as correctly decodable are specified.

Figure 22:
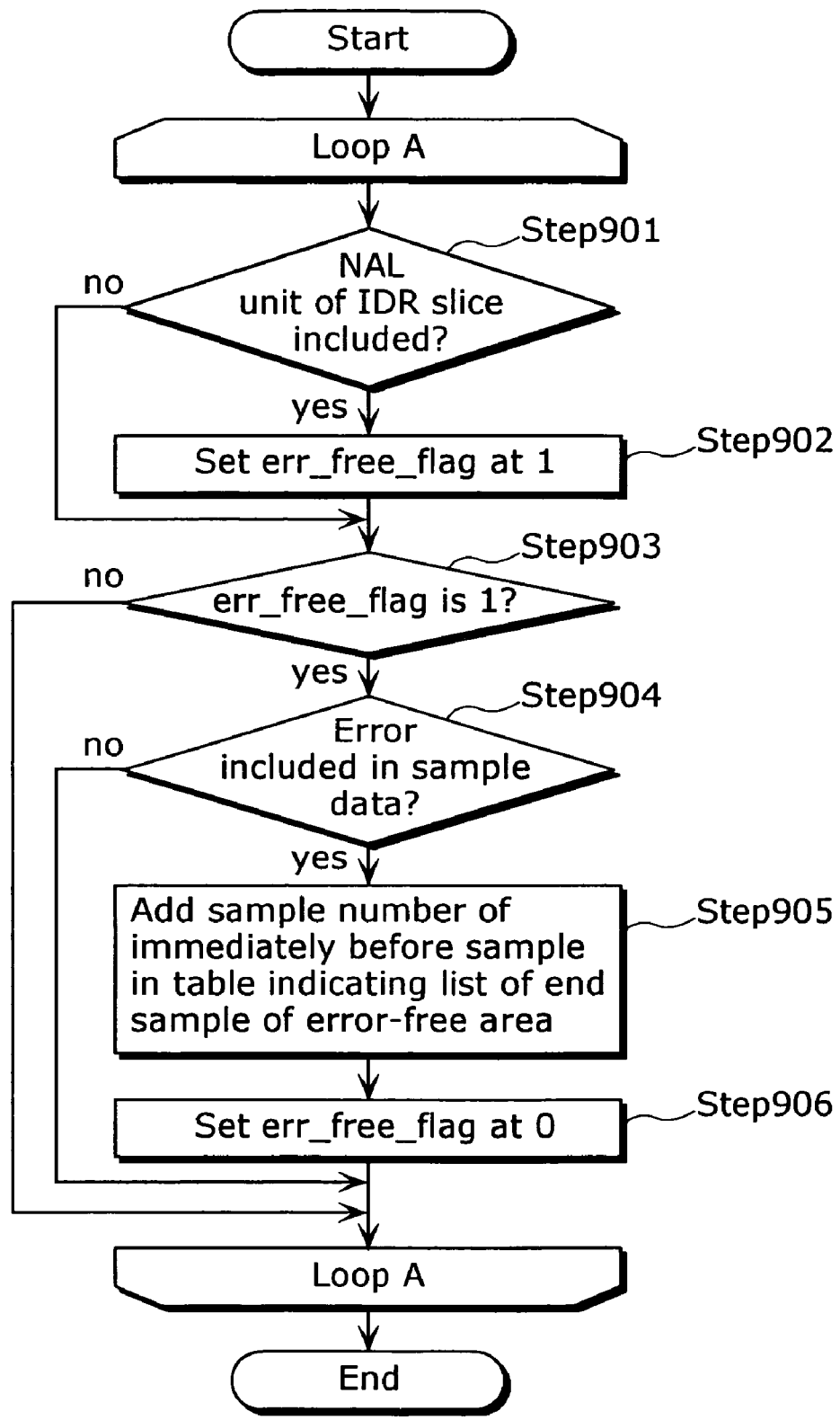
FIG. 22 is a flow chart showing the operation of making an Error free end sample box in the multiplex scheme conversion apparatus in a third embodiment of the present invention.

FIG. 22 is a flow chart showing the operation performed at the time of making a Box indicating error information. Here, err_free_flag is a flag indicating that data loss has not occurred in samples placed between the sample from which a sequence is started to the current sample, and its initial value is 0. In the step 901, judgment on whether or not the NAL unit of an IDR slice is included in a sample is made, and if included, err_free_flag is set to 1 in the step 902. In the step 903, whether err_free flag is 1 or not is judged as follows: the processing of step 904 is performed in the case where the value is 1; or in the case where the value is 0, the following steps are skipped and the processing of the next sample is started. In the step 904, judgment on whether or not the data of the NAL unit that composes a sample is lost is made. Furthermore, it is possible to judge that data is not lost in the step 904 in the case where NAL unit data of an SPS or a PPS is not lost. In the case where a NAL unit whose data is lost is included, the sample number of the immediately-before sample is added to the table showing the list of last samples of the respectively corresponding error free areas in the step 905. Here, "error-free area" means the area of samples that are placed in a decoding order and guaranteed as free from a data loss. At the time of performing a random access, decoding is started from a Sync sample, and further, the starting sample of an error-free area is a Sync sample because a Sync sample includes a NAL unit of an IDR slice. Note that, in the case where the data of a sample including a NAL unit of an IDR slice is lost, an error-free area is not defined for the sample. Consequently, step 905 is skipped. In this way, the processing from step 901 to step 905 is repeated until the processing of the last sample in a 'trak' is completed. Here, guaranteeing that a data loss has not occurred indicates that an error is not detected judging from the continuity_counter value of a TS packet, but does not always guarantee that no data loss has occurred. Note that, in the case where packet losses can be detected more correctly based on packet loss information except continuity_counter, an error may be detected using the information.

Note that it is also possible to use information except the last sample, for example, by indicating the number of samples included in an error-free area as long as it is possible to indicate the error-free area.

FIG. 23 shows a concrete example at the time of making a Box for storing error information using the operation shown in the flow chart as FIG. 22. FIG. 23A shows two continuous sequences, each of which being composed of ten pieces of samples. In the sequence #1, starting from the first sample, the data of the seventh and ninth samples are lost, and in the sequence #2, starting from the eleventh sample, the data of the sixteenth sample is lost. The procedure taken at the time of determining an error-free area will be described below. First, the err_free_flag is set at 1 for the first sample. As it is judged that the data of samples up to the sixth sample are not lost in the step 904, processing of steps 905 and 906 are skipped and the value of err_free_flag is held at 1. Next, as it is judged that the sample data of the seventh sample is lost in the step 904, an entry is added to the table for storing the last samples of the respectively corresponding error-free areas in the step 905, and the sample number indicating the sixth sample that is the immediately-before sample is stored. The err_free_flag values of the samples between seventh to tenth samples inclusive remains 0. Consequently, the err_free_flag value of the eleventh sample is set at 1 again, and likewise the case of sequence #1, the fifteenth sample is added to the table as the last sample of the corresponding error-free area. FIG. 23B shows a Sync sample table. FIG. 23B shows the table of the last sample of an error-free area. The two tables of FIG. 23B and FIG. 23C show that samples whose sample numbers are one to six are included in the error-free area in the sequence #1, and that samples whose sample numbers are eleven to fifteen are included in the error-free area in the sequence #2. FIG. 23D is an example syntax of Error free end sample box that is a Box indicating a list of last samples of the respectively corresponding error-free areas, and end_sample_number shows the sample numbers of the last samples of the respectively corresponding error-free areas. An Error free end sample box is placed immediately below 'stbl' in the 'trak' in 'moov', or immediately below a track fragment run box ('traf') in 'moof', but it may be placed immediately below another Box.

Note that whether or not a NAL unit of an IDR slice is included in a sample is judged and an err_free_flag is set in the step 901, but in the case where the sample including the NAL unit of an IDR slice is not always made to be a Sync sample, it is impossible to specify the error-free area using the Sync sample list shown in 'stss' and the Error free end sample box. Therefore, it is possible to judge whether or not the sample is a Sync sample and, if it is the Sync sample, determine setting an err_free_flag to the Sync sample. Also, it is possible to show not the last sample of the respectively corresponding error-free areas but the leading samples. For example, in the case where all the data of the sixth to tenth samples of the sequence #1 are completely available in FIG. 23A, it is possible to show that the sixth sample to the eleventh sample that is the leading sample of the sequence 2 are included in the error-free area by assigning 6 to the leading sample of the error-free area.

Note that, in the MP4, it is possible to specify the Gradual decoder refresh point, other than a Sync sample, as a randomly-accessible sample. The Gradual decoder refresh point indicates the sample having the following features: it cannot be decoded correctly; it enables decoding the following samples correctly under the condition that the specified number of following samples are decoded in a decoding order; and it enables indicating the sample from which decoding is started in the case where there is a need for starting decoding from the sample placed earlier by the specified number in the decoding order in the interest of decoding a sample correctly. For example, when decoding is started from the "M"th sample in the decoding order, in the case where samples that can be decoded correctly are the "N"th sample (where N>M) and the following samples, the information indicating the difference between N and M is shown in the MP4 file. Therefore, it is possible to use the sample corresponding to the Gradual decoder refresh point as the leading sample of the corresponding error-free area.

Note that it is possible to concurrently indicate the leading sample and the last sample of an error-free area so that the error-free area can be specified without being associated with a Sync sample.

The list of last samples of the respectively corresponding error-free areas is shown in the above explanation, but it is possible to indicate whether or not a sample whose data is lost is included in a sequence. The case will be described below with reference to FIG. 24. FIG. 24A shows six continuous sequences, each of which being composed of ten samples. Here, all the sample data are completely available in the four sequences of #1, #3, #4 and #6, but in contrast, a sample whose data is lost is included in the sequences of #2 and #5. FIG. 24C is a list of leading samples in the corresponding sequences where sample data in a sequence are completely available. FIG. 24B is a list of Sync samples in the case where leading samples of the respectively corresponding sequences are made to be Sync samples. With reference to the two tables of FIG. 24B and FIG. 24C, it is possible to know that the sequences where a data loss has occurred starts from the Sync samples whose sample numbers are 11 and 41 and that the sequences where a data loss has not occurred starts from the Sync samples whose sample numbers are 1, 21, 31 and 51. Note that in the case where samples including a NAL unit of an IDR slice are not always made to be a Sync sample, it is also possible to indicate whether or not a data loss has occurred in the sample data between the two continuous Sync samples. FIG. 24D is an example syntax of the Error free sequence box indicating the list of the leading sample of the sequence where a data loss does not occur. Here, sequence_start_sample_number in the syntax shows the sample number of the leading sample of the sequence. Note that it is also possible to indicate an index such as good, medium and bad as a parameter indicating the quality of the reproduction video obtained at the time of reproducing a sequence depending on the data loss rate in a sequence in addition to the leading sample numbers of a sequence. For example, it is possible to determine the quality depending on the data loss rate, the appearance frequency of intra-coded AUs and the rate of intra-macroblocks. Further, it is possible to store the information indicating the samples that can be decoded correctly in the sequence. To be more specifically, indicating the reference relationship between samples and whether or not data is lost in the NAL units of slice data, SPSs or PPSs in each sample makes it possible to know whether or not the data of the reference-destination sample is lost at the time of decoding the sample. Here, Error free sequence box is placed immediately below 'stbl' in the 'trak' in 'moov', and immediately below a track fragment run box ('traf') in 'moof', but it may be placed immediately below another Box.

Also, it is possible to use, in combination, Error sample boxes, Error free end sample boxes and Error free sequence boxes that have already been described in the first to third embodiments. For example, using an Error sample box in combination with an Error free end sample box makes it possible to identify the sample whose data is lost, among samples outside the error-free area, and determine samples to be decoded.

Also, it is possible to determine the reproduction quality of a 'trak' based on the rate of samples that can be decoded correctly or samples whose data is lost and place a Box where the information indicating the reproduction quality is stored at the position immediately below 'trak', or to place, at the position immediately below 'moov', a Box where the information indicating the reproduction quality is stored at the time of concurrently reproducing a 'trak' of audio, video or text data.

Note that, in the above-mentioned respective embodiments, it is possible to perform processing of the following parts separately: the part to be converted from a byte stream format to a NAL size format and the part to which the information indicating a data loss is added. For example, it is possible to add data loss information to the NAL unit data transmitted in a form of a NAL size format or a format used in video distribution on the Internet such as Real time transmission protocol (RTP).

Also, in the case of multiplexing coded data of the MPEG-4 AVC, AU format conversion unit 303 can be used. Note that it is possible to convert the format of the coded data into a byte stream format in order to simplify the coding processing of the MPEG-4 AVC, and for example, it is possible to apply the processing of the AU format conversion unit 303 at the time of multiplexing the coded data outputted from the coding unit using a multiplex scheme such as a TS and an MP4 whose storage format of coded data is different. Here, processing for complementing data loss can be omitted because an error is not present in a stream at the time of coding. Note that the byte stream format is converted to the NAL size format in the AU format conversion unit 303, but it is possible to convert the NAL size format to the byte stream format at the time when the format of the output data at the time of coding is converted into the NAL size format.

Fourth Embodiment

The demultiplexer concerning the fourth embodiment of the present invention will be described with reference to FIG. 25 to FIG. 27. The demultiplexer inputs the MP4 file made by the multiplex scheme conversion apparatus in the first to third embodiments, demultiplexes, decodes and displays the AU data. This demultiplexer determines decoding and displaying operations by referring to error information shown in an Error sample box and the like. Therefore, it can determine the operation of skipping to the next sequence and the like based on file-format-level information in the case where a lot of samples that cannot be decoded correctly are included in a sequence, and as a result, it can prevent the deterioration of reproduction quality caused by decoding and displaying samples that cannot be decoded correctly. Also, it can obtain the same output result also in the case where a decode unit or a display unit that performs different error concealment processing by determining decoding and displaying operations based on the file-format-level information. Note that, in the case where a data loss in a sample is shown in the MP4 file to be inputted in the demultiplexer, a Box indicating error information (loss information) is added. The operation performed at the time of reproducing a 'trak' of the MPEG-4 AVC will be described below. A 'trak' to be reproduced is not limited to the MPEG-4 AVC, it may be coded video data such as H.263 or the MPEG-4 visual, coded audio data such as the MPEG-4 AAC or AMR or the coded data that concurrently reproduces a 'trak' composed of video and audio data.

Figure 25:
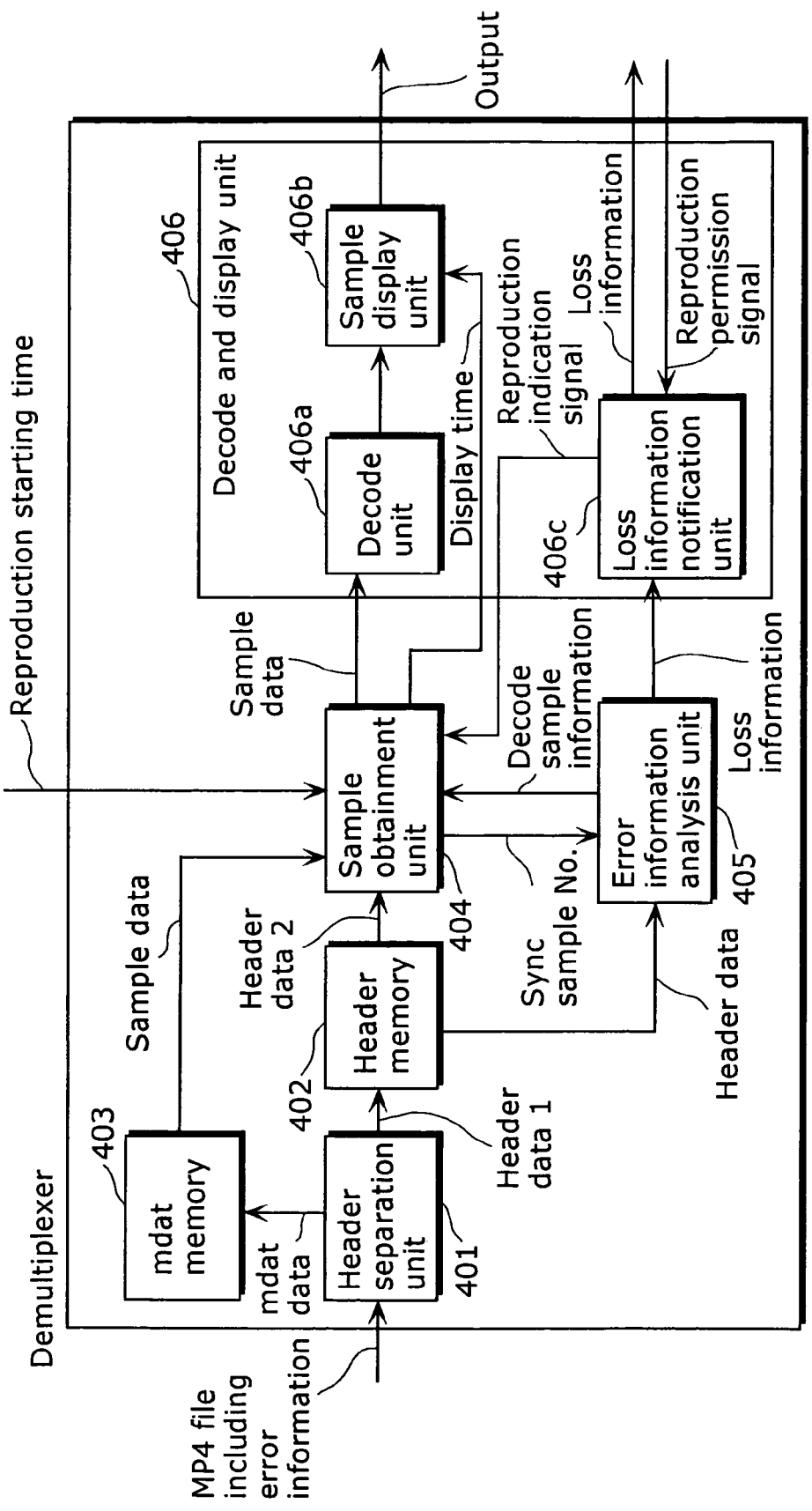
FIG. 25 is a block diagram showing the structure of a demultiplexer in a fourth embodiment of the present invention.
Figure 26:
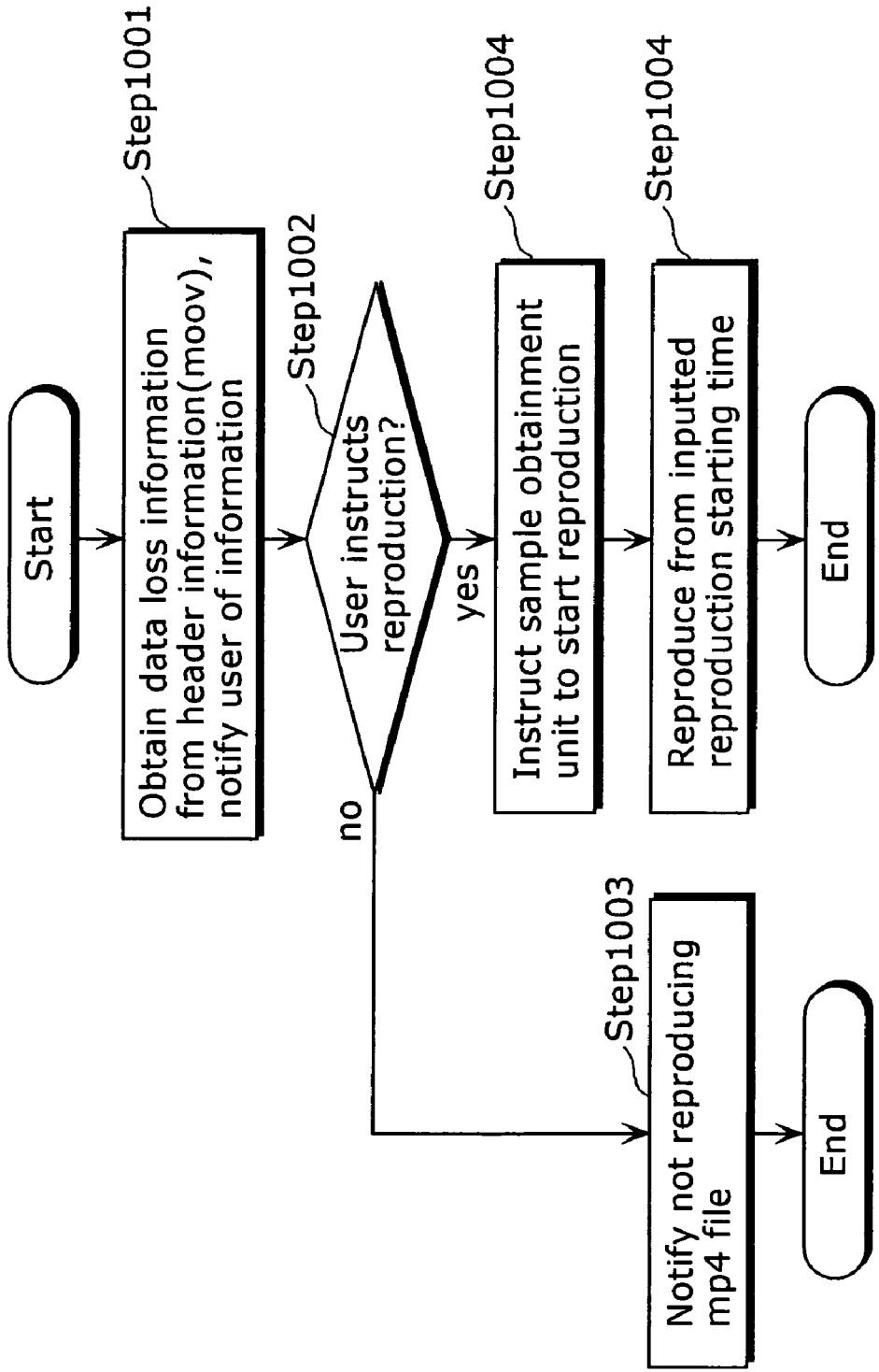
FIG. 26 is a flow chart showing the operation performed at the time of reproducing an MP4 file in the demultiplexer in the fourth embodiment of the present invention.

FIG. 25 is a block diagram showing the structure of the demultiplexer. The demultiplexer includes a header demultiplex unit 401, a header memory 402, a 'mdat' memory 403, a sample obtainment unit 404, an error information analysis unit 405, and a decode and display unit 406, and it starts reproduction processing triggered by reproduction starting time to be inputted from outside. The reproduction starting time becomes zero second at the time of starting reproduction processing from the top of a file, or it becomes ten seconds at the time of starting reproduction processing from the position ten seconds later from the top. Note that there is a case where a Sync sample having reproduction starting time that matches the inputted reproduction starting time is not present at the time of starting decoding and reproduction from a Sync sample. In this case, decoding and reproduction is started from one of the immediately-before Sync sample and the immediately-after Sync sample that has reproduction starting time nearest to the inputted reproduction starting time. Note that it is also possible to start reproduction from not a Sync sample but the sample shown as a Gradual decoder refresh point.

The header separation unit 401 separates a header part including 'moov' and 'moof' and a data part composed of 'mdat' from the MP4 file, outputs the data of the header part to a header memory 402 and outputs the data of 'mdat' to a 'mdat' memory 403. The sample obtainment unit 404 determines a Sync sample from which decoding is started based on the reproduction starting time information inputted from outside. As to the following samples, the sample number of the Sync sample is outputted to an error information analysis unit 405 at the time of obtaining the header information of the Sync sample. The error information analysis unit 405 obtains and analyzes error information in the sequence that starts from the Sync sample number inputted by the sample obtainment unit 404 from an Error sample box, an Error free end sample box or an Error free sequence box, determines the sample to be decoded in a sequence, and after that, outputs the list of the samples to be decoded to the sample obtainment unit 404. Also, the error information analysis unit 405 outputs the obtained loss information to the loss information notification unit 406C of the decode and display unit 406. Also, in the case where data loss information for each NAL unit of a slice can be obtained, the information indicating a slice to be decoded in a sample may be outputted. Note that samples to be decoded may be determined on the basis of predetermined number of samples instead of being determined on a Sync sample-by-Sync sample basis. The sample obtainment unit 404 analyzes 'moov' or 'moof', obtains the data and the display time of the samples to be decoded, the samples being determined by the error information analysis unit, and outputs them to the decode and display unit 406. Here, 'moov' or 'moof' are obtained from the header memory 402 and the data of samples are obtained from the 'mdat' memory 403. Note that, in the case where decoding time is different from display time, both of them may be outputted to the decode and display unit 406.

Lastly, the decode and display unit 406 includes a decode unit 406*a*, a sample display unit 406*b* and a loss information notification unit 406*c*. The decode unit 406*a* decodes sample data. The sample display unit 406*b* displays the decoded sample data according to their display time. The loss information notification unit 406*c* notifies a user of the information such as the loss rate (lost data/all data) of sample data based on the loss information, and makes an inquiry as to whether the MP4 file should be reproduced or not. Also, on receiving a reproduction permission signal in the case where a user permitted reproduction based on the information such as the loss information of sample data, the sample obtainment unit 404 outputs the reproduction indication signal to the sample obtainment unit 404. Note that the error information analysis unit 405 may not determine samples to be decoded but output the error information, to the decode and display unit 406, such as the information of samples whose data are lost or an error-free area including such samples. After that, the decode and display unit 406 may determine samples or slice data to be decoded based on the inputted error information or the information shown by the NAL unit for error notification inserted into the sample data. At this time, a list of decoded samples is not outputted to the sample obtainment unit 404.

Next, the operation for reproducing the MP4 file performed by the demultiplexer structured like above will be described. FIG. 26 is a flow chart showing the operation performed at the time of reproducing the MP4 file.

The loss information notification unit 406*c* notifies a user of the MP4 file or loss information for each 'trak' that are obtained from the header information ('moov') by the error information analysis unit 405 and inquires the user of whether the user should reproduce the MP4 file or not (step 1001). Next, whether or not the user indicated reproduction in reply to this inquiry is judged (step 1002). In the case where the indication is that reproduction should be performed (Yes in the step 1002) as a result of the inquiry, the loss information notification unit 406*c* orders reproduction by outputting a reproduction indication signal to the sample obtainment unit 404 (step 1004). It starts reproduction from the inputted reproduction starting time, decodes samples until the last sample is decoded or the user indicates the completion of the reproduction (step 1005). On the other hand, in the case where the indication is that reproduction should not be performed (No in the step 1002) as a result of the inquiry, the user is notified that the MP4 file should not be reproduced (step 1003).

Next, the procedure performed at the time of reproducing samples in the step 1005 will be described.

Figure 27:
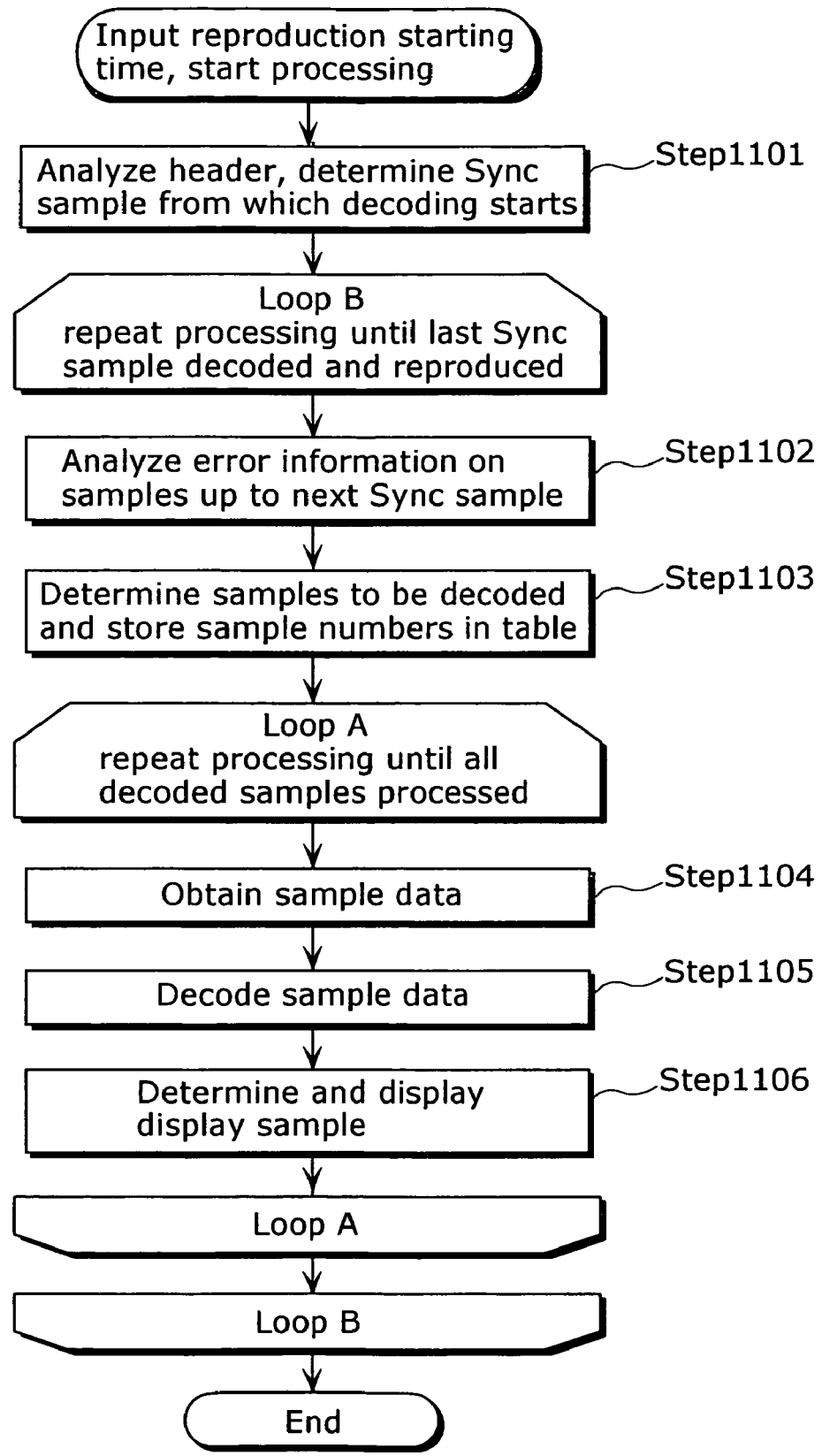
FIG. 27 is a flow chart showing the operation of the demultiplexer in the fourth embodiment of the present invention.

FIG. 27 is a flow chart showing the operation performed in the step 1005. First, a Sync sample from which decoding is started is determined based on the inputted reproduction starting time in the step 1101. After the processing of step 1101 is completed, the processing of Loop B is performed. The Loop B indicates repeating the processing of step 1102 to 1106, and it is repeated every time a new Sync sample is decoded in decoding. In the step 1102, error information as to whether data is lost or not is obtained in the samples between (i) an Error sample box, an Error free end sample box or an Error free sequence box and (ii) the next Sync sample. In the step 1103, samples to be decoded in the sequence are determined based on the error information obtained in the step 1102, and a list of sample numbers of samples to be decoded is stored in a table. After the step 1103 is completed, samples to be decoded based on the table made in the step 1103 are decoded and displayed in order of the processing of Loop A. The Loop A is composed of the processing from step 1104 to step 1106, and it is repeated until the processing of the last sample to be decoded at the time of reproduction is completed. In the step 1104, sample data and sample display time are obtained by analyzing 'moov' or 'moof'. In the step 1105, sample data obtained in the step 1104 are decoded, and in the step 1106, sample data decoded in the step 1105 are displayed based on the display time obtained in the step 1104.

The procedure taken at the time of determining samples to be decoded will be described below with reference to the respective Error sample box, Error free end sample box and Error free sequence box in the step 1102.

First, at the time of referring to an Error sample box, it is determined that samples whose data are lost are not decoded. Note that, in the case where data loss information can be obtained on a basis of NAL unit of a slice, it is possible to determine whether or not samples should be decoded on the basis of slice NAL unit of a sample. Also, in the case where whether or not the data of the slice NAL unit referred to at the time of decoding the slice NAL unit of a sample is shown, it is possible to decode the slice NAL unit data only in the case where all the data of the slice NAL units as reference destinations are completely available. For example, in the case where a coding type of slice NAL units composing each sample periodically changes to another coding type, it is possible to identify the data of samples referred to by the slice NAL unit on condition that the periodical structure has already known. Here is an example: a coding type periodically changes to another coding type every 15 samples, and the coded type of the slice NAL unit in each of samples in a period is IBBPBBPBBPBBPBB in a decoding order. Here, "I" shows an intra slice or a sample composed of IDR slices, "B" shows a sample composed of bi-directionally-predictive slices and "P" shows a sample composed of one-directionally-predictive slices. At this time, on condition that a B sample refers to two samples except the B sample placed immediately before in decoding order and P sample refers to a sample except the B sample placed immediately before in decoding order, it is possible to identify the sample referred to by the slice data of a B sample and a P sample.

Next, it is determined that samples outside an error-free area are not decoded when samples to be decoded are determined with reference to an Error free end sample box.

Lastly, when samples to be decoded are determined with reference to an Error free sequence box, in the case where samples whose data is lost are included in the two continuous Sync samples, only the first Sync sample is decoded.

Note that, in the case where two or more boxes of Error sample box, Error free end sample box and Error free sequence box are concurrently used, it is possible to change the determination method of samples to be decoded depending on the box that is being used. For example, in the case where an Error sample box and an Error free end sample box are used concurrently, samples to be decoded correctly among samples outside the error-free area are shown by the information of an Error sample box. At this time, it is possible to decode samples outside the error-free area. The same is true of the case where an Error sample box and an Error free sequence box are concurrently used.

Also, in this embodiment, the loss information notification unit 406c inquires the user of whether or not the MP4 file should be reproduced, but another or no inquiry may be made. For example, the loss information notification unit 406c may simply notify the user of the information such as loss rate of sample data instead of inquiring the user of whether the MP4 file is reproduced or not. Also, the loss information notification unit 406c may judge the information such as loss rate of sample data using a predetermined threshold and, in the case where the condition is satisfied, output reproduction indication signal to the sample obtainment unit 404. Further, the loss information notification unit 406c may judge the information such as loss rate of sample data using a predetermined threshold and, in the case where the condition is not satisfied, inquire the user of whether the MP4 file is reproduced or not.

Note that the multiplex scheme conversion apparatus can also reproduce a conventional MP4 file.

Fifth Embodiment

Figure 28:
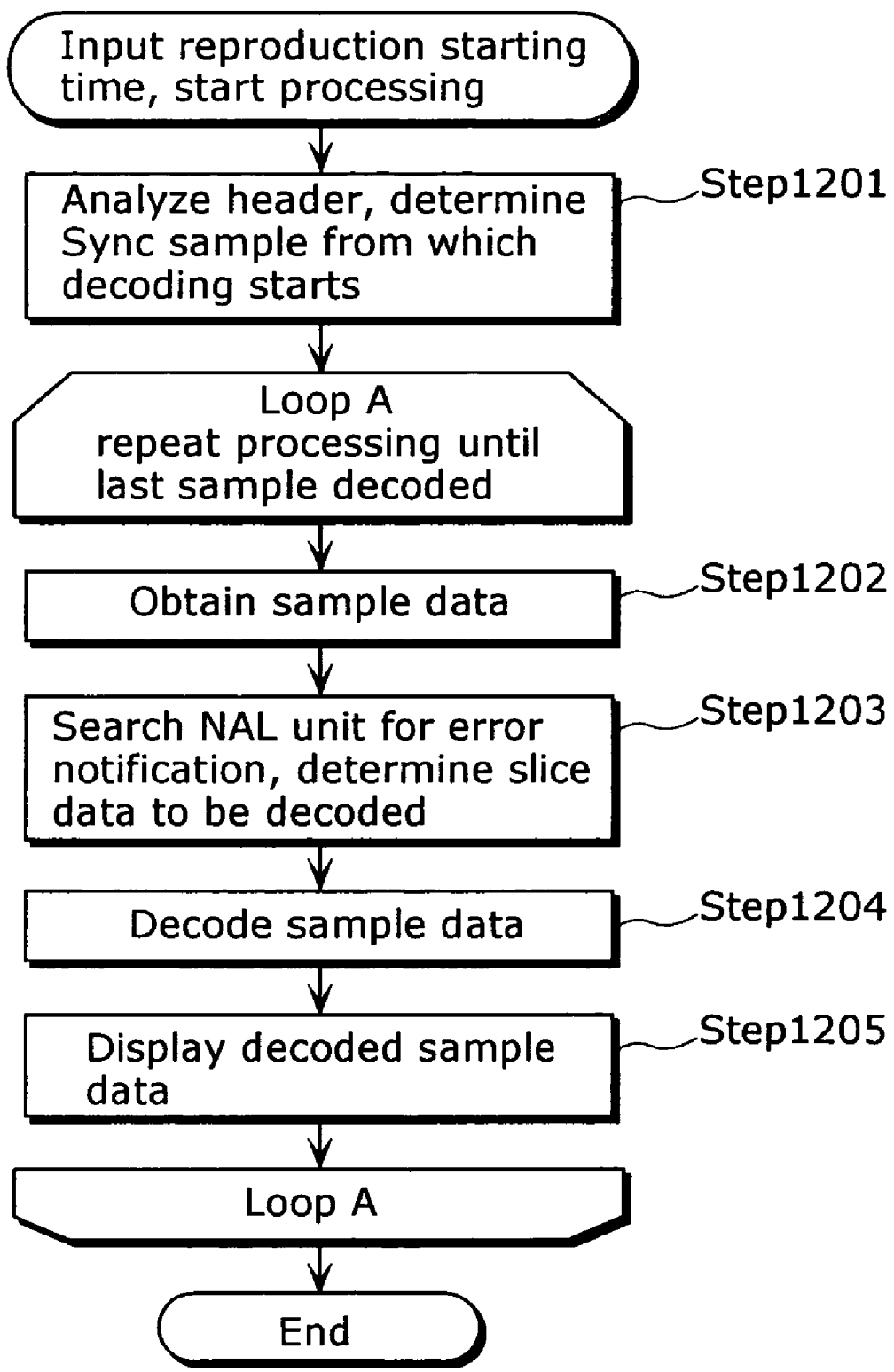
FIG. 28 is a flow chart showing the operation of the demultiplexer in a fifth embodiment of the present invention.

The demultiplexer concerning the fifth embodiment of the present invention will be described with reference to FIG. 28. The demultiplexer inputs the MP4 file made by the multiplex scheme conversion apparatus in the first to third embodiments, multiplexes, decodes and displays the AU data. The demultiplexer determines decoding or displaying operations by referring to the error information shown in the NAL unit for error notification inserted into the sample data. Note that a Box indicating error information does not need to be added to the MP4 file to be inputted to the demultiplexer. The operation performed at the time of reproducing a 'trak' of the MPEG-4 AVC will be described below, but a 'trak' to be reproduced is not limited to the MPEG-4 AVC. It may be the video coded data such as H.263 or the MPEG-4 visual, audio coded data such as the MPEG-4 AAC or AMR or coded data that reproduces 'trak's composed of video and audio data concurrently.

The structure of this demultiplexer is the same as the structure of the demultiplexer of the fourth embodiment shown in FIG. 25 except that it does not have the error information analysis unit 405 and it is not described here. FIG. 28 is a flow chart showing the operation of this demultiplexer. First, the Sync sample from which decoding is started is determined based on the reproduction starting time inputted in the step 1101. The processing of Loop A is performed after the processing of step 1101 is completed. The Loop A indicates repeating the processing of step 1102 to 1105, and it is repeated until the processing of the last sample to be decoded in reproduction is completed. In the step 1102, the data of samples to be decoded is obtained. The following processing of step 1103 to step 1105 is performed by the decode and display unit 406. In the step 1103, a NAL unit for error notification and a sample is identified in a sample data obtained in the step 1102 and in the case where it is shown that the sample is not correctly decoded, the sample is not decoded. Consequently, the data of the slice NAL unit to be decoded, such slice NAL data being determined in the step 1103, is decoded in the step 1104, and in the step 1105, the decoded sample data is displayed based on the display time.

Sixth Embodiment

Here, the system where the multiplex scheme conversion apparatus and a demultiplexer shown in the above-mentioned first to fifth embodiments will be described.

Figure 29:
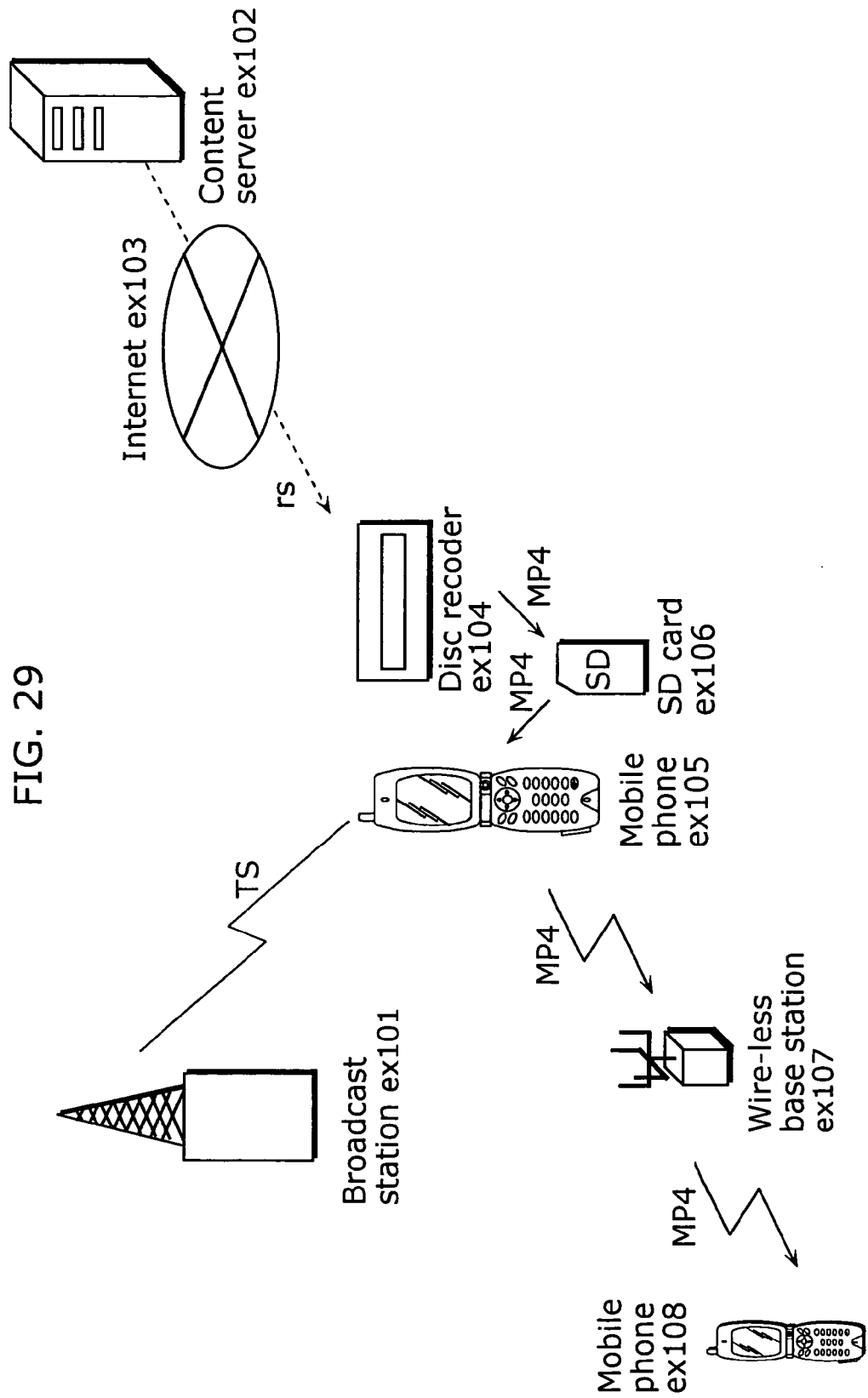
FIG. 29 is an illustration showing a use example of the demultiplexer in a sixth embodiment of the present invention.

FIG. 29 is a block diagram showing the whole structure of the system for realizing a content distribution service through broadcasting and communication. First, the case of receiving broadcasting data will be described. A mobile phone ex105 or a disc recorder ex104 such as a DVD recorder receives a TS packet sequence where coded digital media data is multiplexed. The mobile phone ex105 converts the received TS packet sequence into an MP4 by using its internal multiplex scheme conversion apparatus in the present invention and then records it in an SD card ex106. The recorded MP4 file can be viewed or listened to by a mobile phone ex105 having a demultiplexer in the present invention, a disc recorder ex104 or a personal computer that is not shown. Also, it is possible to view and listen to the MP4 file by attaching it to electric mail and, via the mobile phone ex105 to the wireless base station ex107, sending it to another mobile phone ex108 having a demultiplexer in this invention. Furthermore, it may be downloaded from the mobile phone ex105 to the mobile phone ex108 or distributed in pseudo-streaming by using a protocol such as the Hyper text transport protocol (HTTP) and the Transmission control protocol (TCP) instead of attaching it to electric mail.

Also, the disc recorder ex104 can make its internal multiplex scheme conversion apparatus in the present invention to convert the received TS packet sequence to the MP4 and record it in an SD card, an optical disc such as a DVD and a hard disc. Also, it may distribute, in download or in pseudo-streaming, the recorded MP4 file to a mobile phone or a personal computer that is not shown in any figure. Note that it is also possible to record a TS packet sequence in an SD card and convert it to an MP4 file in distribution.

Further, it is possible to use the MP4 file, like in the case where the above-mentioned broadcasting data is received, also in the case where the TS packet sequence distributed from the content server ex102 via the Internet are received by the mobile phone ex105, or the disc recorder ex104.

Seventh Embodiment

It becomes possible to easily perform, in an independent computer system, the processing shown in the embodiments that are respectively mentioned in the above description by recording, in a storage medium such as a flexible disc, (i) the multiplex scheme conversion method performed in the multiplex format conversion apparatus shown in the embodiments respectively described above and (ii) a program for realizing the demultiplex scheme performed in the demultiplexer.

Figure 30A:
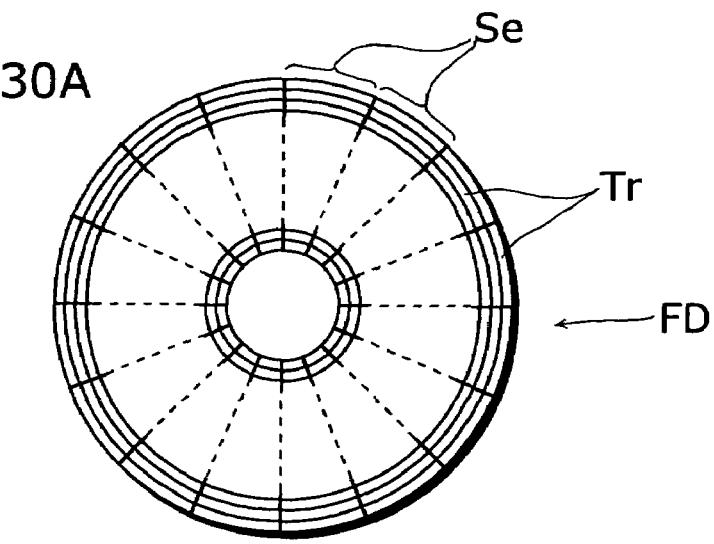
FIGS. 30A to 30C are an illustration concerning a storage medium for storing a program realizing, in a computer system, a multiplex scheme conversion method in the multiplex scheme conversion apparatus in each of the above-mentioned embodiments and a demultiplex scheme in a demultiplexer.
Figure 30B:
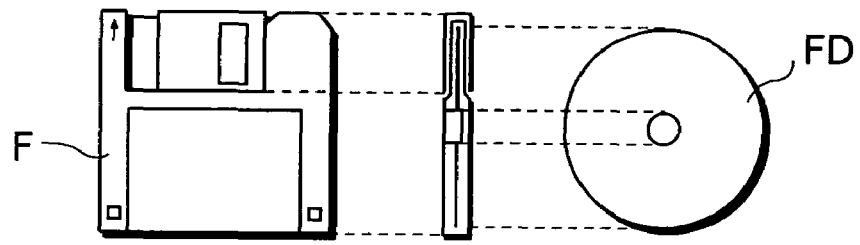
Figure 30C:
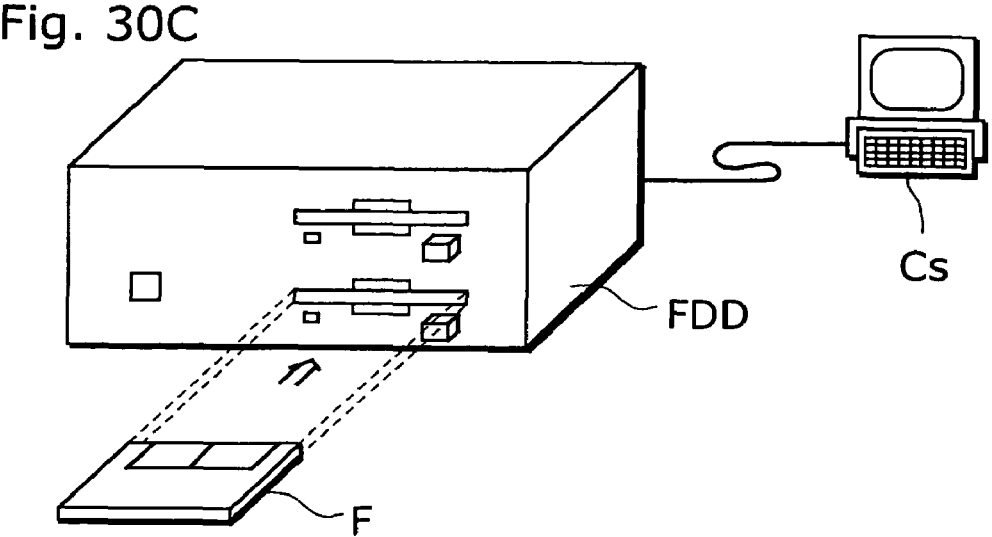

FIGS. 30A to 30C are an illustration of the case where the multiplex scheme conversion method in the multiplex scheme conversion apparatus and the demultiplex scheme in the demultiplexer in the respective embodiments are performed in a computer system using a program recorded in a recording medium such as a flexible disc.

FIG. 30A shows an example of the physical format of a flexible disc as a recording medium body. FIG. 30B shows a flexible disc and the front view and the cross-sectional view of the appearance of the flexible disc. A flexible disc (FD) is contained in a case F, a plurality of traks (Tr) are formed concentrically on the surface of the disc from the periphery into the inner radius of the disc, and each trak is divided into 16 sectors (Se) in the angular direction. Therefore, in the case of the flexible disc storing the above-mentioned program, the program is recorded in an area allocated for it on the flexible disc (FD).

Also, FIG. 30C shows the structure for recording and reading out the program on the flexible disc (FD). When the program for realizing the method for converting multiplex scheme in the multiplex scheme conversion apparatus and the demultiplex scheme performed in the demultiplex apparatus is recorded on the flexible disc (FD), the program is written on a flexible disc by the disc drive of the computer system (Cs). Also, when the multiplex scheme conversion method in the multiplex scheme conversion apparatus and the demultiplex method in the demultiplexer are configured in the computer system by the program on the flexible disc, the program is read out from the flexible disc through a flexible disc drive and transferred to the computer system.

Note that a flexible disc is described as a recording medium above, but the recording medium is not limited to a flexible disc, and an optical disc may be described as a recording medium in a similar way. More specifically, the recording medium is not limited to this, any recording medium such as IC cards and Rom cassettes are also available.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The multiplex scheme conversion apparatus in the present invention is applicable for apparatuses that convert, to an MP4, the coded data such as the MPEG-4 AVC that is sent by the TS, and record or send it. Also, this multiplex scheme conversion apparatus is particularly effective for mobile phones that receive digital broadcasting.

What is claimed is:

1. A demultiplexer which demultiplexes coded data including data units and identification information, said demultiplexer comprising:
   a separation unit operable to separate the identification information from the data units by obtaining the identification information from the coded data, the identification information including at least one of (1) a particular bit string indicating a starting position of a corresponding one of the data units, and (ii) size information of the corresponding one of the data units, and
   a conversion unit operable to:
   judge that the identification information needs to be converted, when the identification information is different from the-predetermined identification information;
   convert a particular bit string into information indicating a size of a corresponding one of the data units by obtaining the size information of the corresponding one of the data units, when it is judged that the identification information needs to be converted and when the predetermined identification information is the information indicating the size of the corresponding one of the data units;
   convert the information indicating the size of the corresponding one of the data units into the particular bit string, when it is judged that the identification information needs to be convened and when the predetermined identification information is the particular bit string indicating the starting position of the corresponding one of the data units; and
   place the converted identification information at the head of the corresponding one of the data units.

2. A demultiplexer which demultiplexes coded data including data units and identification information, said demultiplexer comprising:
   a separation unit operable to separate the identification information from the data units by obtaining the identification information from the coded data; and
   A conversion unit operable to:
   convert the identification information into predetermined identification information, and
   place the predetermined identification information at a head of a corresponding one of the data units,
   wherein the identification information includes at least one of (i) a particular bit string indicating a starting position of a corresponding one of the data units, and (ii) size information of the corresponding one of the data units,
   wherein, when the identification information and next identification information are particular bit strings,
   said conversion unit is operable to:
   obtain a data size of a data portion ranging from the starting position indicated by the identification information to a starting position indicated by the next identification information; and
   convert the identification information that is the particular bit string into the predetermined identification information that is the information indicating the data size.

3. A demultiplexer which demultiplexes coded data including data units and identification information, said demultiplexer comprising:
   A separation unit operable to separate the identification information from the data units by obtaining the identification information from the coded data, the identification information including at least one of (i) a particular bit string indicating a starting position of a corresponding one of the data units, and (ii) size information of the corresponding one of the data units, and
   a conversion unit operable to:
   judge that the identification information needs to be converted, when the identification information is different from predetermined identification information;
   convert the information indicating the size of the corresponding one of the data units into the particular bit string, when it is judged that the identification information needs to be converted and when the predetermined identification information is the particular bit string indicating the starting position of the corresponding one of the data units; and
   place the converted identification information at the head of the corresponding one of the data units.

4. A demultiplexer which demultiplexes coded data including data units and identification information, said demultiplexer comprising:
   a separation unit operable to separate the identification information from the data units by obtaining the identification information from the coded data, the identification information including at least one of (i) a particular bit string indicating a starting position of a corresponding one of the data units, and (ii) size information of the corresponding one of the data units, and
   a conversion unit operable to:
   judge that the identification information needs to be converted, when the identification information is different from predetermined identification information;
   convert a particular bit string into information indicating a size of a corresponding one of the data units by obtaining the size information of the corresponding one of the data units, when it is judged that the identification information needs to be converted and when the predetermined identification information is the information indicating the size of the corresponding one of the data units; and place the converted identification information at the head of the corresponding one of the data units.

\* \* \* \* \*

UNITED STATES PATENT AND TRADEMARK OFFICE
CERTIFICATE OF CORRECTION

PATENT NO. : 7,567,584 B2  Page 1 of 1
APPLICATION NO. : 11/033832
DATED : July 28, 2009
INVENTOR(S) : Tadamasa Toma and Yoshinori Matsui It is certified that error appears in the above-identified patent and that said Letters Patent is hereby corrected as shown below:

In Claim 1

Column 27, line 49, "(1)" should read --(i)--; line 56, "the-" should be removed; and line 67, "convened" should read --converted--.

In Claim 2

Column 28, line 14, "information," should read --information;--.

Signed and Sealed this

First Day of June, 2010

David J. Kappos
*Director of the United States Patent and Trademark Office*